US006950056B2

(12) United States Patent
Hager et al.

(10) Patent No.: US 6,950,056 B2
(45) Date of Patent: Sep. 27, 2005

(54) METHODS AND APPARATUS FOR DETERMINATION OF A FILTER CENTER FREQUENCY

(75) Inventors: James R. Hager, Golden Valley, MN (US); Thomas W. Heidemann, Anoka, MN (US); Thomas R. Jicha, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/144,745

(22) Filed: May 13, 2002

(65) Prior Publication Data

US 2003/0214431 A1 Nov. 20, 2003

(51) Int. Cl.$^7$ ................................................ G01S 7/40
(52) U.S. Cl. ........................ 342/165; 342/62; 342/63; 342/65; 342/115; 342/120; 342/165; 342/462
(58) Field of Search .............................. 342/25, 29, 62, 342/63, 65, 120, 147, 153, 156, 159, 161, 165, 115, 450, 455, 461, 462, 463, 465

(56) References Cited

U.S. PATENT DOCUMENTS

| 3,728,727 | A | | 4/1973 | Botwin et al. |
| 3,735,399 | A | | 5/1973 | Sletten et al. |
| 3,737,900 | A | | 6/1973 | Vehrs, Jr. |
| 4,164,036 | A | | 8/1979 | Wax |
| 4,310,894 | A | | 1/1982 | Lee et al. |
| 4,328,495 | A | | 5/1982 | Thue |
| 4,553,221 | A | | 11/1985 | Hyatt |
| 4,684,950 | A | | 8/1987 | Long |
| 4,851,852 | A | | 7/1989 | Bjorke et al. |
| 5,107,268 | A | | 4/1992 | Sturm et al. |
| 5,140,331 | A | | 8/1992 | Aulenbacher et al. |
| 5,150,125 | A | | 9/1992 | Hager |
| 5,173,706 | A | | 12/1992 | Urkowitz |
| 5,260,708 | A | * | 11/1993 | Auterman ..................... 342/25 |
| 5,264,853 | A | | 11/1993 | Sturm et al. |
| 5,309,161 | A | | 5/1994 | Urkowitz et al. |
| 5,389,931 | A | | 2/1995 | Anderson et al. |
| 5,477,226 | A | | 12/1995 | Hager et al. |
| 5,485,157 | A | | 1/1996 | Long |
| 5,589,833 | A | | 12/1996 | Randall et al. |
| 5,659,318 | A | * | 8/1997 | Madsen et al. ................ 342/25 |
| 5,767,802 | A | | 6/1998 | Kosowsky et al. |
| 5,781,148 | A | * | 7/1998 | Severwright ................. 342/120 |
| 5,867,119 | A | | 2/1999 | Corrubia et al. |
| 5,892,462 | A | | 4/1999 | Tran |
| 5,894,286 | A | | 4/1999 | Morand et al. |
| 5,945,926 | A | | 8/1999 | Ammar et al. |
| 5,969,667 | A | | 10/1999 | Farmer et al. |
| 6,011,505 | A | | 1/2000 | Poehler et al. |

(Continued)

FOREIGN PATENT DOCUMENTS

FR      2 634 901 A1    2/1990

*Primary Examiner*—Thomas H. Tarcza
*Assistant Examiner*—Isam Alsomiri
(74) *Attorney, Agent, or Firm*—Matthew Luxton, Esq.; Armstrong Teasdale LLP

(57) ABSTRACT

A method for calculating a center frequency and a bandwidth for a radar doppler filter is herein described. The center frequency and bandwidth are calculated to provide radar performance over varying terrain and aircraft altitude, pitch, and roll. The method includes receiving an antenna mounting angle, a slant range, and velocity vectors in body coordinates, calculating a range swath doppler velocity, a track and phase swath bandwidth, and a phase swath doppler velocity. The method continues by calculating a range swath center frequency based on the range swath doppler velocity, calculating a phase swath center frequency based on the phase swath doppler velocity, and calculating a level and verify swath bandwidth based upon the track and phase swath bandwidth.

10 Claims, 19 Drawing Sheets

U.S. PATENT DOCUMENTS

| | | | | |
|---|---|---|---|---|
| 6,025,800 A | * | 2/2000 | Hager | 342/450 |
| 6,114,984 A | | 9/2000 | McNiff | |
| 6,125,155 A | * | 9/2000 | Lesthievent et al. | 375/350 |
| 6,148,195 A | | 11/2000 | Schuchman et al. | |
| 6,232,910 B1 | | 5/2001 | Bell et al. | |
| 6,233,522 B1 | | 5/2001 | Morici | |
| 6,260,052 B1 | | 7/2001 | Song | |
| 6,297,764 B1 | | 10/2001 | Wormington et al. | |
| 6,337,888 B1 | * | 1/2002 | Huang et al. | 375/322 |
| 6,362,775 B1 | | 3/2002 | Goebel et al. | |
| 6,362,776 B1 | * | 3/2002 | Hager et al. | 342/121 |
| 6,377,214 B1 | | 4/2002 | Melville, II et al. | |
| 6,407,697 B1 | | 6/2002 | Hager et al. | |

* cited by examiner

METHODS AND APPARATUS FOR DETERMINATION OF A FILTER CENTER FREQUENCY

BACKGROUND OF THE INVENTION

This invention relates generally to radar systems, and more specifically to a radar system which is capable of synchronization with a digital elevation map (DEM) to accurately determine a location.

The proper navigation of an aircraft in all phases of its flight is based to a large extent upon the ability to determine the terrain and position over which the aircraft is passing. In this regard, instrumentation, such as radar systems, and altimeters in combination with the use of accurate electronic terrain maps, which provide the height of objects on a map, aid in the flight path of the aircraft. Electronic terrain maps are well known and are presently used to assist in the navigation of aircraft.

Pulse radar altimeters demonstrate superior altitude accuracy due to their inherent leading edge return signal tracking capability. The pulse radar altimeter transmits a pulse of radio frequency (RF) energy, and a return echo is received and tracked using a tracking system. The interval of time between signal bursts of a radar system is called the pulse repetition interval (PRI). The frequency of bursts is called the pulse repetition frequency (PRF) and is the reciprocal of PRI.

FIG. 1 shows an aircraft 2 with the Doppler effect illustrated by isodops as a result of selection by the use of Doppler filters. The area between the isodops of the Doppler configuration will be referred to as swaths. The Doppler filter, and resulting isodops are well known in this area of technology and will not be explained in any further detail. Further, the aircraft 2 in the specification will be assumed to have a vertical velocity of zero. As is known, if a vertical velocity exists, the median 8 of the Doppler effect will shift depending on the vertical velocity. If the aircraft 2 has a vertical velocity in a downward direction, the median of the Doppler would shift to the right of the figure. If the aircraft 2 has a vertical velocity in an upward direction, the Doppler would shift to the left of the figure. Again, it will be assumed in the entirety of the specification that the vertical velocity is zero for the ease of description. However, it is known that a vertical velocity almost always exists.

Radar illuminates a ground patch bounded by the antenna beam 10 from an aircraft 2. FIG. 1a shows a top view of the beam 10 along with the Doppler effect and FIG. 1b shows the transmission of the beam 10 from a side view. To scan a particular area, range gates are used to further partition the swath created by the Doppler filter. To scan a certain Doppler swath, many radar range gates operate in parallel. With the range to each partitioned area determined, a record is generated representing the contour of the terrain below the flight path. The electronic maps are used with the contour recording to determine the aircraft's position on the electronic map. This system is extremely complex with all the components involved as well as the number of multiple range gates that are required to cover a terrain area. As a result, the computations required for this system are very extensive.

In addition to the complexity, the precision and accuracy of the distance to a particular ground area or object has never been attained using an airborne radar processor.

BRIEF SUMMARY OF THE INVENTION

In one aspect, a method for calculating a center frequency and a bandwidth for a radar doppler filter is provided. The center frequency and bandwidth are calculated to provide radar performance over varying terrain and aircraft altitude, pitch, and roll. The method comprises receiving an antenna mounting angle, a slant range, and velocity vectors in body coordinates, calculating a range swath doppler velocity, and a track and phase swath bandwidth, and calculating a phase swath doppler velocity based at least in part on the range swath doppler velocity and the track and phase swath bandwidth. The method further comprises calculating a range swath center frequency based on the range swath doppler velocity, calculating a phase swath center frequency based on the phase swath doppler velocity, and calculating a level and verify swath bandwidth based upon the track and phase swath bandwidth.

In another aspect, a processor is provided which is configured to receive an antenna mounting angle, a slant range, and velocity vectors in body coordinates, calculate a range swath doppler velocity, and a track and phase swath bandwidth, and calculate a phase swath doppler velocity based at least in part on the range swath doppler velocity and the track and phase swath bandwidth. The processor is further configured to calculate a range swath center frequency based on the range swath doppler velocity, calculate a phase swath center frequency based on the phase swath doppler velocity, and calculate a level and verify swath bandwidth based upon the track and phase swath bandwidth.

In still another aspect, a swath band pass filter is provided. The filter comprises a first order filter and is configured to center on a doppler frequency and operate according to $Eo=(A0/B0) \times En - (A0/B0) \times En \times Z^{-2} - (B1/B0) \times Eo \times Z^{-1} - (B2/B0) \times Eo \times Z^{-2}$, where En is an input signal, A0 is $2 \times Fs \times Wb$, B0 is $(4 \times Fs^2)+(2 \times Fs \times Wb)+(Wl \times Wu)$, B1 is $(2 \times Wl \times Wu)-(8 \times Fs^2)$, and $B2=(4 \times Fs^2)-(2 \times Fs \times Wb)+(Wl \times Wu)$, and $Wb=2\pi B$, a bandwidth in radians, $Wu=2\pi \times (Fc+B/2)$, an upper 3 db point of said filter in radians, and $Wl=2\pi \times (Fc-B/2)$, a lower 3 db point of said filter in radians.

In yet another aspect, a radar signal processing circuit is provided. The circuit comprises a radar gate correlation circuit configured sample radar data at a sampling rate, a correlation bass pass filter configured to filter non-zero gated radar return samples and ignore zero amplitude samples, a mixer configured to down sample an in-phase component and a quadrature component of the filtered signal to a doppler frequency, a band pass filter centered on the doppler frequency, and a processor configured to determine a center frequency for the band pass filter.

DETAILED DESCRIPTION OF THE INVENTION

Figure 1A:
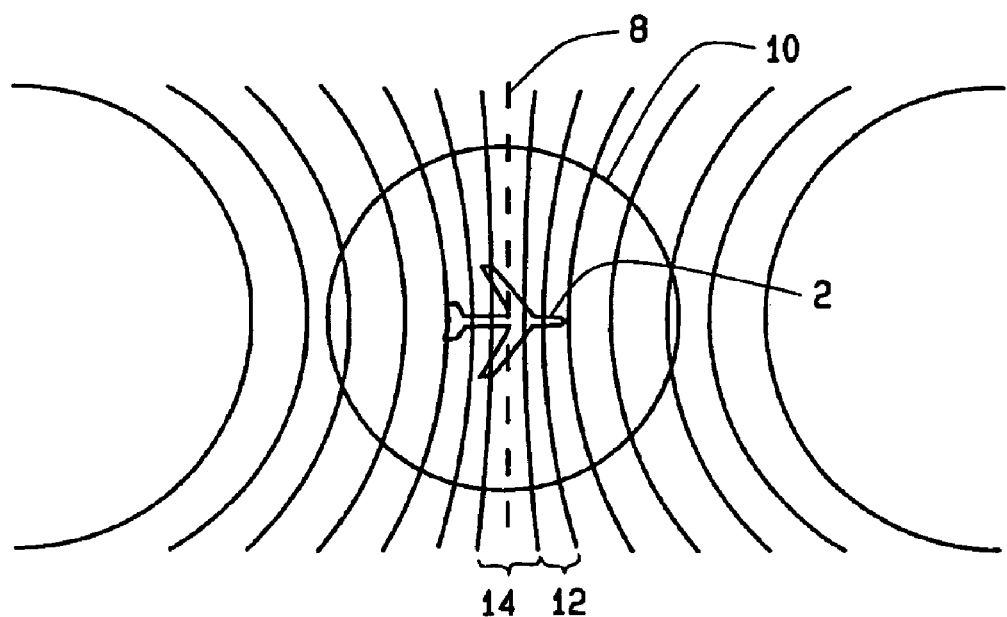
FIG. 1a is a diagram illustrating swaths made by a radar.
Figure 1B:
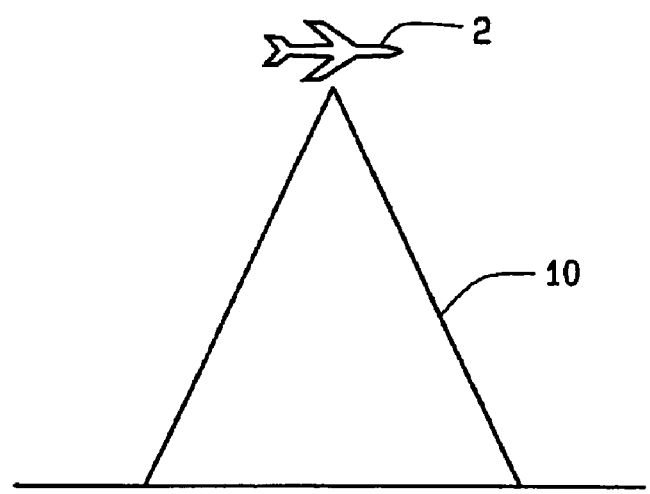
FIG. 1b is a diagram illustrating a radar transmit pattern.

There is herein described a combination Doppler radar/interferometer to navigate an aircraft 2 with respect to terrain features below aircraft 2. As used herein, aircraft is used to identify all flight platforms which may incorporate a radar system, including, but not limited to, jets, airplanes, unmanned aerial vehicles, missiles, and guided weapons. The radar also functions with an electronic map, sometimes referred to herein as a digital elevation map (DEM), in determining a position of aircraft 2. In addition to determining an altitude of aircraft 2, an XYZ location of the nearest object to aircraft 2 on the ground, with respect to aircraft 2 in a certain terrain area can be determined. As aircraft 2 is flying over terrain as shown in FIGS. 1a and 1b, it is important to determine a position of aircraft 2 in accordance with a map. A Doppler filter and range gate are used with a transmitted beam 10 from a transmit antenna.

Figure 2:
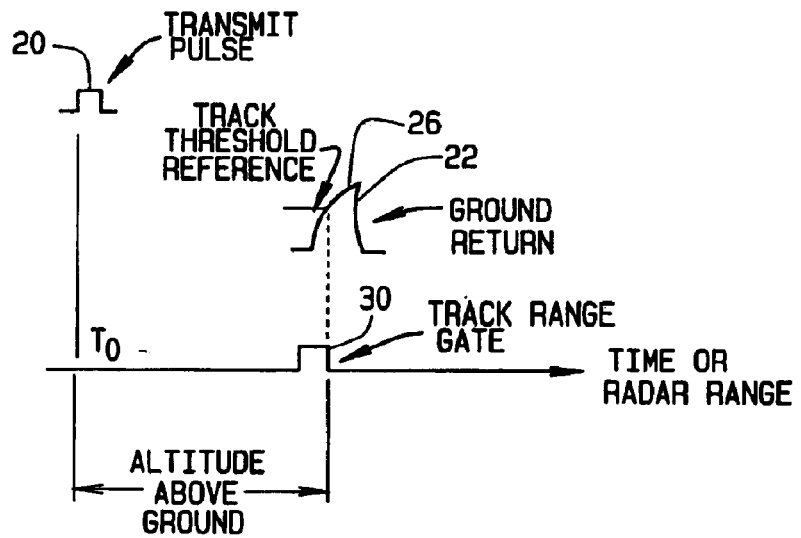
FIG. 2 is an illustration of radar signal waveforms over time.

In a general altitude range tracking radar, range is measured and indicated by measuring the time for transmitted energy to be reflected from the surface and returned. With reference to FIG. 2, a radar transmitter repeatedly sends out bursts of electromagnetic energy at a predetermined repetition rate from an antenna, as indicated by transmit pulse 20. Following a time delay which is a function of the aircraft altitude, a ground return pulse 22 is received by a receiving antenna feeding a receiver. A range gate 30 is utilized by the tracking radar to view at least a portion of ground return 22.

Figure 3:
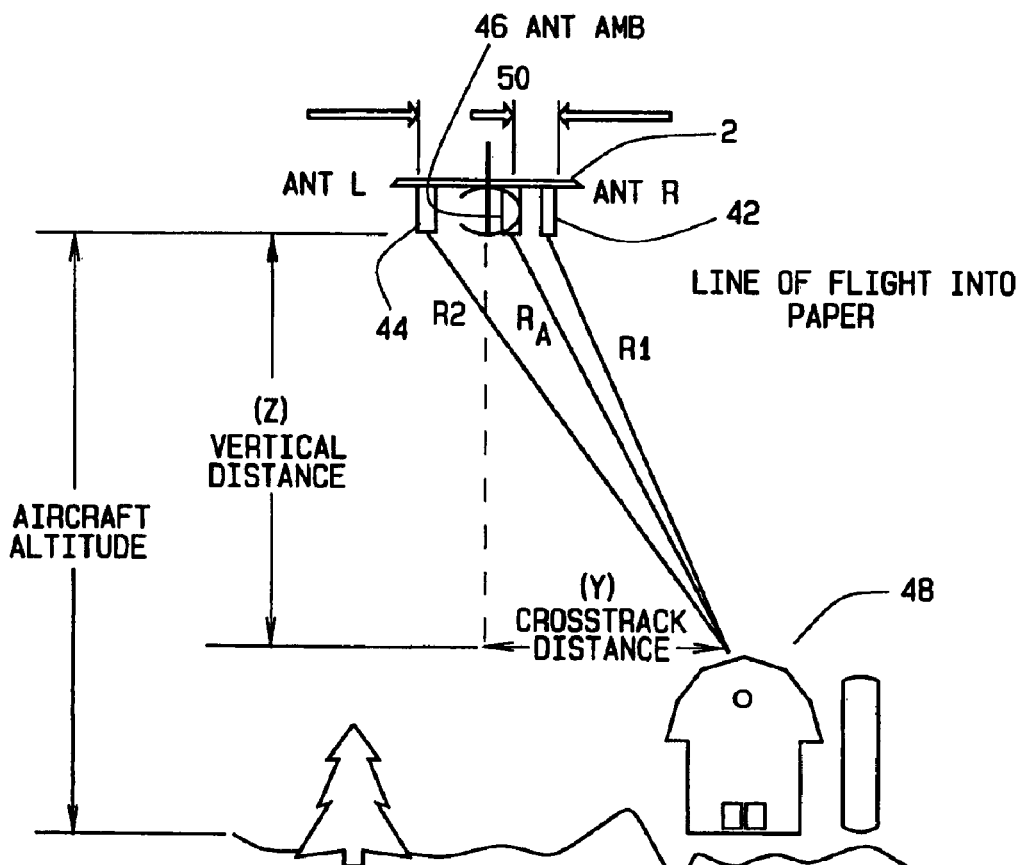
FIG. 3 is a diagram illustrating radar signals being received by three antennas.

Referring to FIG. 3, three receive antennas, antenna R (right) 42, Antenna L (left) 44, and an ambiguous antenna (Ant Amb) 46, are used to receive information. Along with the three antennas, three processing channels, referred to below as left, right and ambiguous respectively, each include a receiver, a data acquisition device, range gate, and a filter. Use of the three antenna system, along with the processing described herein, provides a solution to ambiguous detected angle of the nearest object. The ambiguous detected angle is due to the spacing of the antennas being greater than the transmitted RF frequency wavelength. By receiving three returns, the processing system is able to determine an unambiguous location of the nearest object on the ground, which in turn is utilized to locate position of aircraft 2 in body coordinates. Body coordinates are typically preferable than positioning as determined by known systems, as those systems determine position as if the body aircraft 2 is aligned with the line of flight. As aircraft 2 is prone to pitch, roll, and yaw, the body of aircraft 2 is not necessarily aligned with the line of flight.

In an exemplary illustration, antenna R 42, along with processing systems (described below) will provide a course range search which roughly determines the range to the nearest point 48 in swath 12 (shown in FIG. 1) before aircraft 2 has passed over from swath 14 into swath 12. Determination of the nearest point 48 is performed by a wide bandwidth, high speed track loop which quickly determines the range to nearest point 48 in swath area 12. Nearest point 48 provides a starting point for a tracking loop using antenna L 44 and ambiguous antenna 46. The track loop controls the range gate to track returns from a transmit antenna. A narrow bandwidth, high precision processor is used to set range gates for antenna L 44 and ambiguous antenna 46 to an exact range of nearest point 48 based on the previous course range determination. The operation of the three receive antennas and associated processing channels provides a quick and accurate setting of a range gate on the nearest object in the Doppler swath 14 directly below aircraft 2 so that a phase difference can be measured and along with the known separations 50 amongst the three antennas, a crosstrack distance to the object 48 is determined. The crosstrack distance is the distance, horizontal and perpendicular to the body coordinates of aircraft 2, to object 48.

FIG. 3 shows a view with aircraft 2 going into the Figure. During the phase comparison portion of the time interval, the Doppler filters of the left, right and ambiguous channels are set to select a swath 14 (shown in FIG. 1) below aircraft 2. Further, both range gates are set at a range directly on the nearest object 48 as previously determined. From this range, antenna R 42 receives a signal from object 48 at a distance of R1, ambiguous antenna 46 receives a signal from the object 48 at a distance of RA, and antenna L 44 receives the signal from object 48 at a distance of R2 where the distance difference is a function of the antenna separation 50 between and amongst the three antennas. A phase processor (described below) compares the phase difference between R1 and RA, R2 and RA, and R1 and R2 once the return signals are received. As illustrated in the Figure, the exact range differences (R2−R1), (RA−R1), and (R2−RA) are from phase differences and simple trigonometry relations are used to determine the exact crosstrack distance to the object 48 in aircraft body coordinates.

As illustrated in FIG. 3, after the range differences (R2−R1), (RA−R1), and (R2−RA) are determined and knowing the antenna separations 50, and measured range R1, then the crosstrack distance (Y) and vertical distance (Z) can also be computed in aircraft body coordinates. It is important that the precise location of nearest object 48 in each swath is determined so correlation can be made with the electronic maps which will accurately locate the aircraft 2 on the electronic map. For example, at typical high speed aircraft cruising velocities, a radar, configured with reasonably sized Doppler filters, has swath widths of approximately 10 feet at 5000 feet altitude. The resulting incidence angle formed by the intersection of R1 and a vertical line 27 will then be on the order of less than 3 degrees. Basic trigonometry relations show that even with a typical error (for example 1%) on the radar range gate measured distance R1, (50 feet at 5000 feet altitude), knowing the precise antenna separation 50, and precise range differences (R2−R1), (RA−R1), and (R2−RA), the crosstrack distance (Y) will be precise due to the very small incidence angle encountered.

Figure 4:
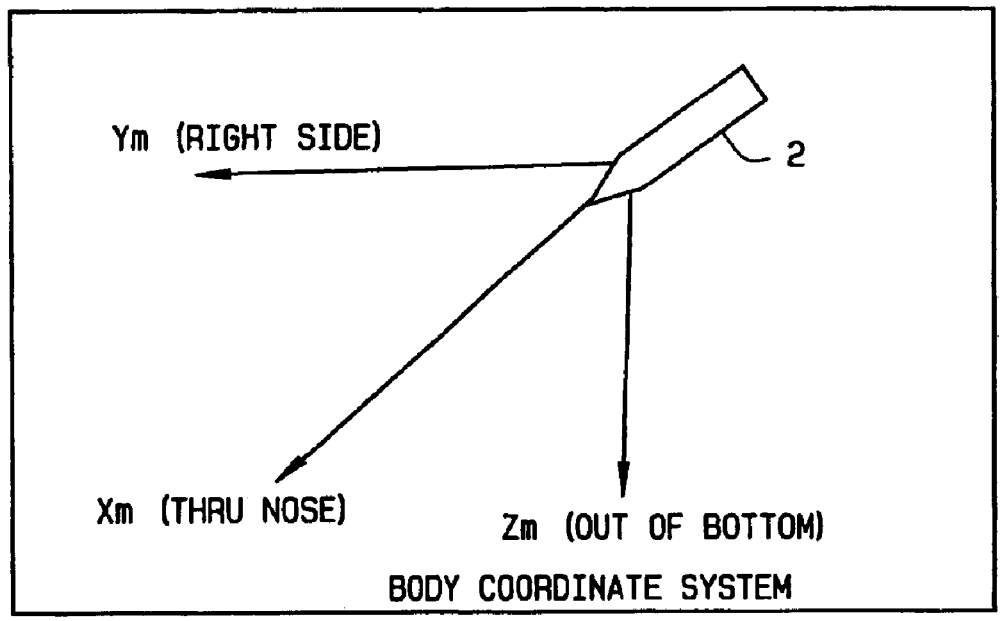
FIG. 4 is a diagram illustrating a body coordinate system.

FIG. 4 illustrates a body coordinate system. The body coordinate system, is the coordinate system with respect to aircraft body 2. An x-axis, Xm is an axis which passes through a nose of aircraft body 2. A y-axis, Ym, is an axis which is 90 degrees from Xm and is positive to the right of aircraft body 2. A z-axis, Zm, is an axis which is 90 degrees from both Xm and Ym and perpendicular to a bottom of aircraft body 2. With respect to aircraft maneuvering, a positive roll is a drop of the right wing, a positive pitch is a nose up, and a positive yaw is the nose to the right, all with respect to a line of flight.

Figure 5:
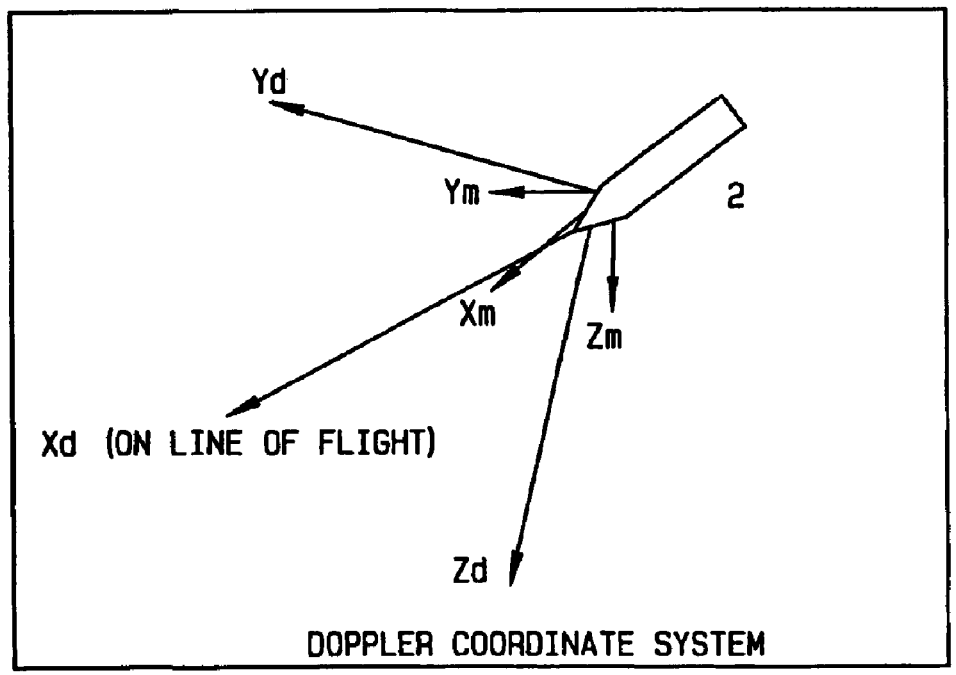
FIG. 5 is a diagram illustrating a doppler coordinate system with respect to the body coordinate system of FIG. 4

It is known that aircraft do not typically fly in alignment with the aircraft body coordinates. Such a flight path is sometimes referred to as a line of flight. Therefore an aircraft which is flying with one or more of a pitch, roll, or yaw, and which has a hard mounted radar system, introduces an error element in a determination of target location, in body coordinates. As such radars typically operate with respect to the line of flight, a coordinate system with respect to the line of flight has been developed and is sometimes referred to as a doppler coordinate system. FIG. 5 illustrates differences between aircraft coordinates and doppler coordinates. An x-axis of the doppler coordinate system, Xd, is on the line of flight. A y-axis, Yd, and a z-axis, Zd, at right angles to Xd, respectively are defined as across Xd, and above and below Xd.

Therefore, if aircraft 2 is flying with no pitch, roll, or yaw, the body coordinate system aligns with the doppler coordinate system. For a positive roll, Xm and Xd are still aligned, while Yd rotates below Ym and Zd rotates to the left of Zm. For a positive yaw, Xd rotates to the right of Xm, Yd rotates behind Ym, and Zd and Zm are aligned. For a positive pitch, Xd rotates above Xm, Yd aligns with Ym, and Zd rotates ahead of Zm. The complexity of having multiple of pitch, roll, and yaw, and determining a target position in aircraft body coordinates is apparent.

Figure 6:
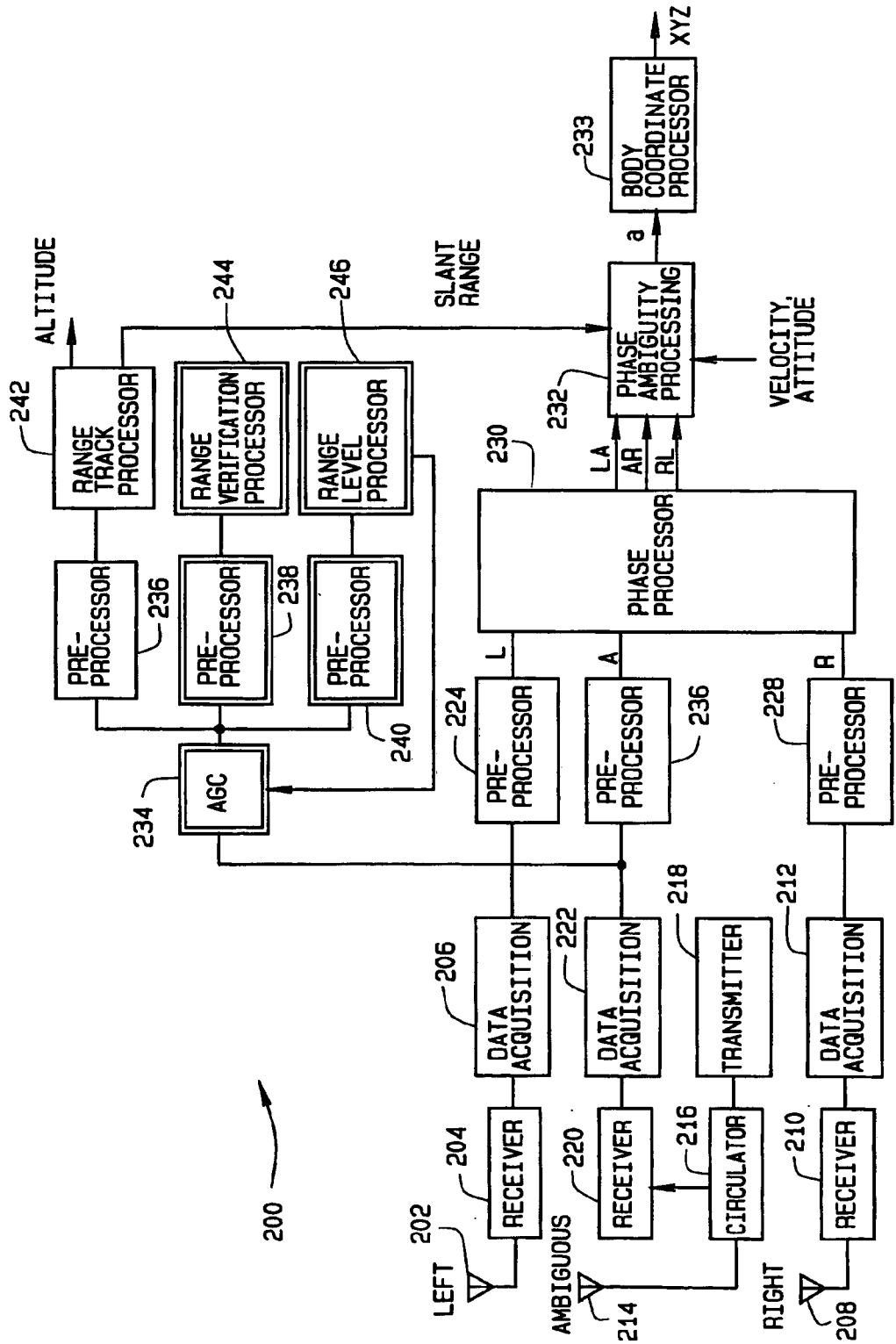
FIG. 6 is a block diagram of a radar signal processing system.

FIG. 6 is one embodiment of a doppler radar processing system 200. System 200 incorporates three radar antennas which receive reflected radar pulses, the pulses having originated from a radar source. A left antenna 202 receives the pulses and forwards the electrical signal to receiver 204. Receiver 204 forwards the received radar signal to a data acquisition unit 206. A right antenna 208 receives the pulses, at a slightly different time than left antenna 202, and forwards the electrical signal to receiver 210. Receiver 210 forwards the received radar signal to a data acquisition unit 212. An ambiguity antenna 214 also receives the reflected radar signal, and passes the received signal to a circulator 216. Circulator 216 functions to direct the transmit signal to the antenna, and to direct the received signal from the antenna to receiver 220, thereby allowing a single antenna to be used for both transmitting and receiving. Receiver 220 forwards the received signal to a data acquisition unit 222.

Data acquisition unit 206 provides a digital signal representative of the signal received at left antenna 202 to a left phase pre-processing unit 224. Similarly, representative signals are received at pre-processing units 226 and 228 from data acquisition units 222 and 212, respectively. Data acquisition units 206, 212, and 222 are configured, in one embodiment, to sample received signals, and thereby reduce the data to a rate which allows a relatively low speed computer to process digitized radar data. In one embodiment, pre-processing units 224, 226, and 228 perform a gate ranging function.

A phase processor 230 receives gated, filtered signals, representative of left, right, and ambiguity signals received at the antennas, and determines a phase relationship between each of the left and ambiguous signal, the right and ambiguous signals, and the right and left signals. The phase relationships between the signals are used, along with slant range, velocity and attitude readings in a phase ambiguity processing unit 232 to determine an interferometric angle to a target. A body coordinate processor 233 utilizes the interferometric angle to determine an XYZ position of, for example, an aircraft employing system 200 with respect to a current aircraft position, sometimes referred to herein as aircraft body coordinates.

A signal from data acquisition unit 222 is also received at an automatic gain control (AGC) unit 234. A signal from AGC unit 234 is passed to pre-processing units 236, 238, and 240. A filtered signal from pre-processing unit 236 is passed to range track processor 242 which provides a slant range signal to phase ambiguity processing unit 232 and altitude information. Pre-processing unit 238 passes a filtered signal to a range verification processor 244. Pre-processing unit 240 passes a filtered signal to a range level processor 246, which also provides a feedback signal to AGC 234.

Figure 7:
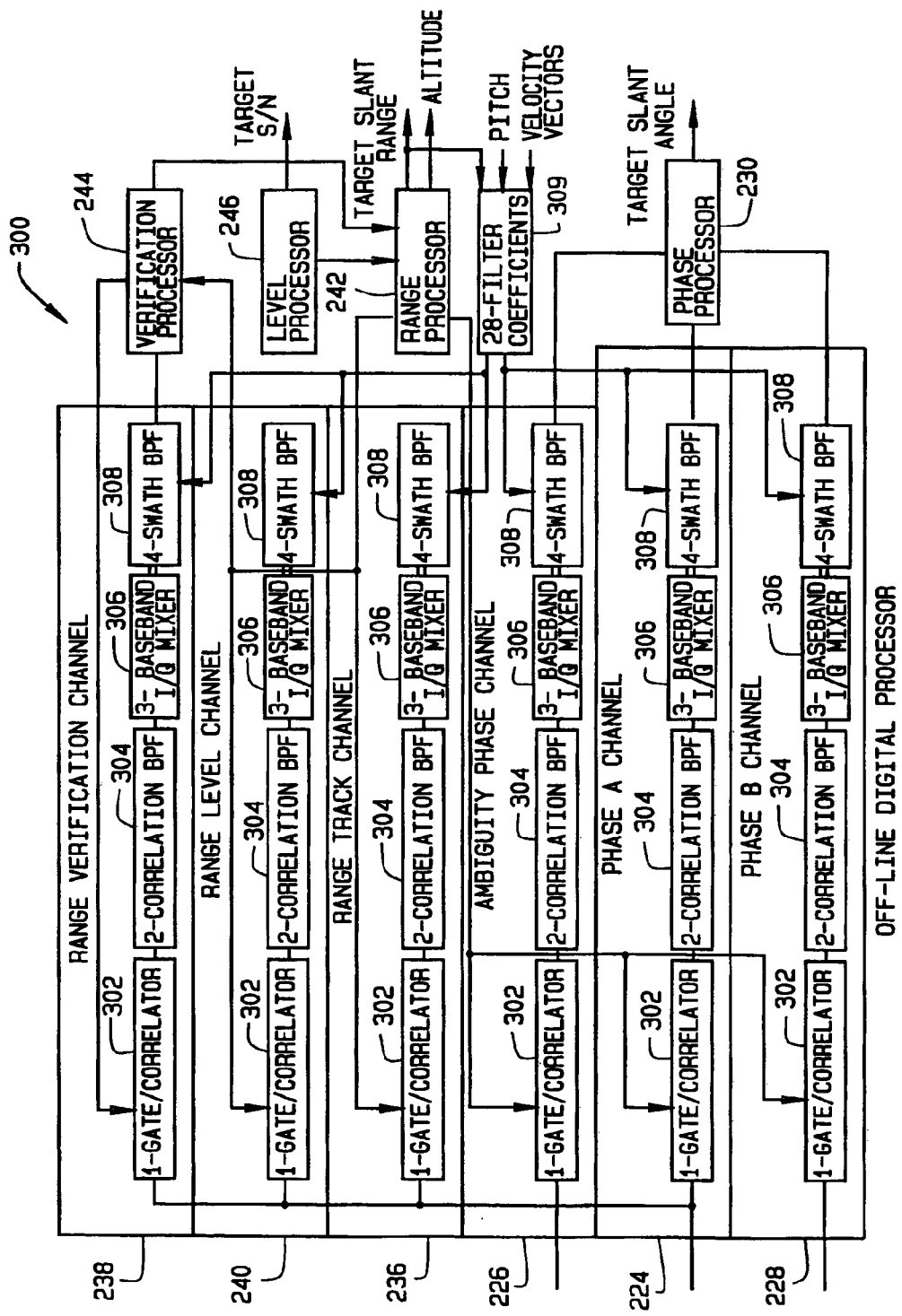
FIG. 7 is a block diagram of a digital sampling and filtering section.

FIG. 7 is a block diagram of a digital processing section 300 for system 200 (shown in FIG. 6). Components in section 300, identical to components of system 200, are identified in FIG. 7 using the same reference numerals as used in FIG. 6. Section 300 includes pre-processing units 224, 226, 228, 236, 238, and 240 and processors 230, 242, 244, and 246. Referring specifically to pre-processing units 224, 226, 228, 236, 238, and 240, each includes a gate correlator 302, a correlation band pass filter 304, a baseband I/Q mixer 306, and a swath band pass filter 308. A filter coefficients processor 309, in one embodiment, is configured to provide at least a filter center frequency in hertz, Fc, a filter bandwidth in hertz, B, and a filter sampling frequency in hertz, Fs, to swath band pass filter 308, which uses Fc, B, and Fs in determination of filter coefficients. In one embodiment, processor 309 receives as input, an antenna mounting angle, velocity vectors in body coordinates, a pitch, and a slant range.

Figure 8:
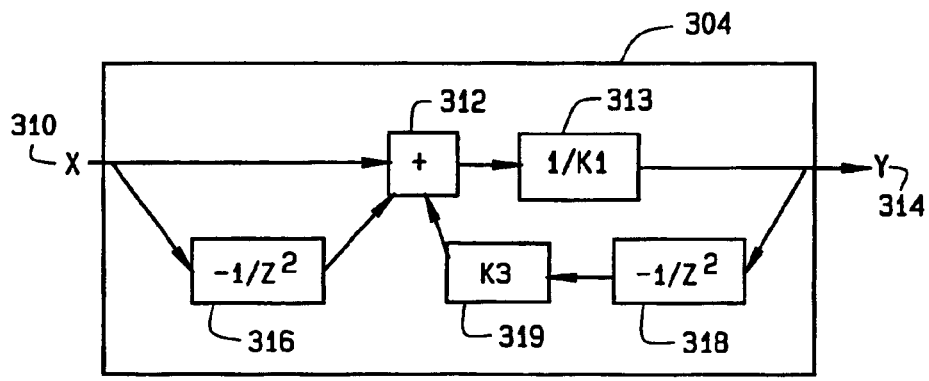
FIG. 8 is a block diagram of a correlation band pass filter.

FIG. 8 is a block diagram of a correlation band pass filter 304 (also shown in FIG. 7). An input signal 310, sometimes referred to as x(0), is fed into a summing element 312. An output of summing element 312 is multiplied by a coefficient 313, which, in one embodiment has a value of 1/K1 (further described below). After multiplication by coefficient 313, an output signal 314, sometimes referred to as y(0), is generated. Another input into summing element 312 is provided by input signal 310 being delayed by a two sample delay element 316, whose output, sometimes referred to as x(−2), is fed into summing element 312. Further, output signal 314 is fed back into a second two sample delay element 318, whose output, sometimes referred to as y(−2), is multiplied by a second coefficient 319, and fed into summing element 312. In one embodiment, coefficient 319 has a value of K3. Therefore, a present output, y(0) is calculated as y(0)=(1/K1)×[x(0)−x(−2)]−(K2×y(−2)), where K1=C+1, K3=C−1, K2=K3/K1, and C=1/Tan($\pi$×bandwidth/$f_{sample}$) where bandwidth and sample frequency are in hertz, and the angle for which the tangent is to be calculated is in radians.

In alternative embodiments, filter 304 is configured to filter range ambiguity spectrum lines, filter out-of-band interference signals and stretch the input signal, which is a pulse, to a continuous wave (CW) signal. Filter 304, in one embodiment, receives as input an output of gate/correlator 302 (shown in FIG. 7) at a sample rate of 100 MHz, an IF frequency of 25 MHz, and has a bandwidth of 10 KHz. Therefore, in this embodiment, there are four samples per IF frequency period.

A sample clock at 100 MHz provides samples at a 10 nsec rate. For example, a 4 μsec pulse repetition interval (PRI) (N=400 clocks per PRI) and two sample gate width, results in two non-zero gated return samples, x(0) and x(1), and 398 zero amplitude samples, x(2)–x(399), into correlation filter 304 during one PRI. In order to provide a filter of reasonable processing size and speed, the zero amplitude samples which do not affect filter output are not processed by filter 304. Therefore, past outputs, for example y(−2), required in the filter feedback configuration, as illustrated by delay elements 316 and 318, at the time of non-zero inputs are not available. These past outputs are calculated based on filter outputs generated during and directly after the previous return (the previous non-zero samples), and filter droop characteristics over a known pulse repetition interval.

In addition, one of the past outputs, y(−1), is not used because it has a feedback multiplier with a value of nearly zero in one embodiment of filter 304, because of the narrow 10 kHz bandwidth.

In one exemplary embodiment, where $F_{sample}$=100 MHz, center frequency=25 MHz, and Bandwidth=8 KHz, coefficients are calculated as K1=3979.873661, K3=3977.873661, and K2=0.9994974715. Let P=the number of samples in a PRI. Filter 304 starts calculating at the beginning of a gate width and continues for two counts after the end of the gate width. After the gate width +2 counts the next step is to calculate y(−2) and y(−1) and wait for x(P) data, the beginning of the next gate width, where x(P) is equivalent to x(0). Table 1 illustrates a general procedure for operation of filter 304, for low altitude radar data, track and phase gate of two sample widths, and a PRI of 400 μsec. The calculation for filter output y(0) requires filter output y(−2). The example of Table 2 example illustrates calculation of y(−2) where N=400, if PRI=4 μsec.

TABLE 1

Correlation Filter Algorithm Example

| x(N) | Count(N) | Algorithm |
|---|---|---|
| 0 | 397 | y(−3) = y(397) |
| 0 | 398 | y(−2) = y(398) |
| 0 | 399 | y(−1) = y(399) |
| x(0) | 0 | y(0) = (1/K1)[x(0) − x(−2)] − [K2 × y(−2)] |
| x(1) | 1 | y(1) = (1/K1)[x(1) − x(−1)] − [K2 × y(−1)] |
| 0 | 2 | y(2) = (1/K1)[x(2) − x(0)] − [K2 × y(0)] |
| 0 | 3 | y(3) = (1/K1)[x(3) − x(1)] − [K2 × y(1)] |
| 0 | 4 | y(4) = 0 − K2 × y(2) = −K2 × y(2) = (−K2)$^1$ × y(2) |
| 0 | 5 | y(5) = 0 − K2 × y(3) = −K2 × y(3) = (−K2)$^1$ × y(3) |
| 0 | 6 | y(6) = 0 − K2 × y(4) = −K2 × y(4) = −K2[(−K2) × y(2)] = (−K2)$^2$ × y(2) |
| 0 | 7 | y(7) = 0 − K2 × y(5) = −K2 × y(5) = −K2[(−K2) × y(3)] = (−K2)$^2$ × y(3) |
| 0 | 8 | y(8) = 0 − K2 × y(6) = −K2 × y(6) = −K2[(−K2) × (−K2) × y(2)] = (−K2)$^3$ × y(2) |
| 0 | 9 | y(9) = 0 − K2 × y(7) = −K2 × y(7) = −K2[(−K2) × (−K2) × y(3)] = (−K2)$^3$ × y(3) |

TABLE 1-continued

Correlation Filter Algorithm Example

| 0 | 10 | y(10) = 0 − K2 × y(8) = −K2 × y(8) = −K2[(−K2) × (−K2) × (−K2) × y(2)] = (−K2)$^4$ × y(2) |
|---|---|---|
| 0 | 11 | y(11) = 0 − K2 × y(9) = −K2 × y(9) = −K2[(−K2) × (−K2) × (−K2) × y(3)] = (−K2)$^4$ × y(3) |

In one embodiment, y(399) becomes y(0) if a range gate is moved in an inbound direction. The resulting P becomes 399. If a range gate is moved in an outbound direction, y(1) becomes y(0), and the resulting P becomes 401. Algorithms shown for determination of y(4) through y(11) are used to formulate a general algorithm equation.

In addition to an example illustration of calculation of y(−2) with a P of 400 and a gate width of two clock counts, Table 2 also illustrates a general algorithm equation for counts (N) greater than three, (i.e. y(N)=(−K2)$^M$×y(2), for N even and y(N+1)=(−K2)$^M$×y(3), where M=(N(even)/2)−1.

TABLE 2

General Algorithm Equation after N = 3

| Ein | Count (N) | Algorithm |
|---|---|---|
| 0 | 396 | y(−4) = (−K2)$^{197}$ × y(2) |
| 0 | 397 | y(−3) = (−K2)$^{197}$ × y(3) |
| 0 | 398 | y(−2) = (−K2)$^{198}$ × y(2) |
| 0 | 399 | y(−1) = (−K2)$^{198}$ × y(3) |
| x(0) | 0 | y(0) = (1/K1)[x(0) − x(−2)] − [K2 × y(−2)] |
| x(1) | 1 | y(1) = (1/K1)[x(1) − x(−1)] − [K2 × y(−1)] |
| 0 | 2 | y(2) = (1/K1)[x(2) − x(0)] − [K2 × y(0)] |
| 0 | 3 | y(3) = (1/K1)[x(3) − x(1)] − [K2 × y(1)] |

In the embodiment described, for y(0) through y(3), the filter algorithm is calculated because new x(N) and/or y(N) data are available. After the y(3) algorithm calculation, y(398) and y(399) are calculated, and the filter algorithm is configured to wait for x(400) data, where x(400) is equivalent to x(0). If a range tracking algorithm dictates that x(0) be x(399), that is, the range gate causes the PRI to be shortened, then y(397) and y(398) are calculated. If the range tracking algorithm dictates that x(0) be x(401), that is, the range gate causes the PRI to be increased, then x(399) and x(400) are calculated. The signal phase is preserved by using the correct x(0) and y(−2). The PRI is not limited to 4 μsec and can have a wide range of values. The filter algorithm is configured to set the N counter to count to 400 on the next cycle unless the range tracking algorithm requires 399 or 401 counts. In general, a filter configured similarly to filter 304 is capable of removing up to about 95% of the mathematical operations that are required in known filter processing schemes.

Another exemplary embodiment of filter 304, for high altitude operation, incorporates a Barker code. Table 3 illustrates an exemplary embodiment, with a chip width equal to four, a PRI of 4 μsec, and P=400. In the exemplary embodiment, a 13 bit Barker code is used, and inputs x(0) and x(1) are data, x(2) and x(3) are filled with zeros, x(4) and x(5) are data, x(6) and x(7) are filled with zeros, and the pattern continues until N is equal to 51. Generally, the algorithm for N greater than 51 is given as y(N)=(−K2)$^M$×y(50), for N even, and y(N+1)=(−K2)$^M$×y(51 where M=(N(even)−50)/2)−1.

TABLE 3

Barker codes at high altitudes example

| x(N) | Count (N) | Algorithm |
|---|---|---|
| 0 | 397 | y(−3) = y(397) |
| 0 | 398 | y(−2) = y(398) |
| 0 | 399 | y(−1) = y(399) |
| x(0) | 0 | y(0) = (1/K1)[x(0) − x(−2)] − [K2 × y(−2)] |
| x(1) | 1 | y(1) = (1/K1)[x(1) − x(−1)] − [K2 × y(−1)] |
| 0 | 2 | y(2) = (1/K1)[x(2) − x(0)] − [K2 × y(0)] |
| 0 | 3 | y(3) = (1/K1)[x(3) − x(1)] − [K2 × y(1)] |
| x(4) | 4 | y(4) = (1/K1)[x(4) − x(2)] − [K2 × y(2)] |
| x(5) | 5 | y(5) = (1/K1)[x(5) − x(3)] − [K2 × y(3)] |
| . | . | . |
| . | . | . |
| . | . | . |
| 0 | 396 | y(−4) = y(396) = (−K2)$^{172}$ × y(50) |
| 0 | 397 | y(−3) = y(397) = (−K2)$^{172}$ × y(51) |
| 0 | 398 | y(−2) = y(398) = (−K2)$^{173}$ × y(50) |
| 0 | 399 | y(−1) = y(399) = (−K2)$^{173}$ × y(51) |
| x(0) | 0 | y(0) = (1/K1)[x(0) − x(−2)] − [K2 × y(−2)] |
| x(1) | 1 | y(1) = (1/K1)[x(1) − x(−1)] − [K2 × y(−1)] |
| 0 | 2 | y(2) = (1/K1)[x(2) − x(0)] − [K2 × y(0)] |

Figure 9:
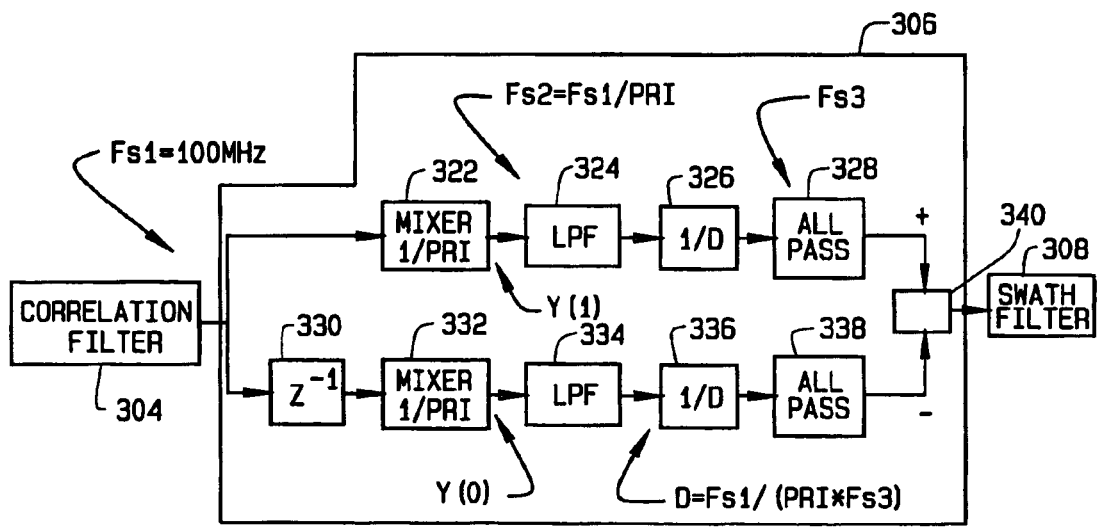
FIG. 9 is a block diagram of a in-phase/quadrature mixer.

FIG. 9 is a block diagram of a baseband IQ mixer 306. Mixer 306 is configured to reject negative Doppler shifts on the IF (Intermediate Frequency) input signal, which are behind aircraft 2, while allowing a positive doppler shift signal, from ahead of aircraft 2 to pass through. The positive doppler shift signal is equally forward as the negative doppler shift signal is behind. Referring specifically to mixer 306, an IF in-phase portion includes a mixer 322 configured to operate at a frequency which is 1/PRI, where PRI is a radar pulse repetition interval, which converts the in-phase IF signal to Baseband (Doppler) frequency. Also included in the in-phase portion are a low pass filter 324, a decimator 326, and an all pass filter 328. Referring specifically to mixer 306, an IF quadrature portion includes a delay element 330, which produces the IF quadrature signal, and a mixer 332 configured to operate at a frequency which is 1/PRI, where PRI is a radar pulse repetition interval, which converts the quadrature IF signal to Baseband (Doppler) frequency. Also included in the quadrature portion are a low pass filter 334, a decimator 336, and an all pass filter 338. All pass filters 328 and 338 are configured to produce Baseband (Doppler) quadrature signals, which are received at a difference element 340, where the output of the all-pass filter 338 is subtracted from the output of the all-pass filter 328. The resulting difference signal contains the positive or forward-looking Baseband (Doppler) signal, which is received at swath bandpass filter 308.

In particular embodiments, a frequency of data received at mixer 306 is 25 MHz, and is referred to as an IF (intermediate frequency) signal. Mixer 306 in one embodiment, is configured to convert the 25 MHz IF signal to baseband (or Doppler) frequencies, and further configured to reject negative Doppler frequencies. In specific embodiments, mixers 322 and 332 are configured with PRIs which allow decimation of the signal from correlation bandpass filter 304 to a 25 kHz sample rate. Specifically, in the embodiment shown, the allowed PRIs include 200, 400, 500, 800, and 1000.

For purposes of description, a current input to low pass filter 324 is given as x1(0). A current output of the low pass filter 324 is then given as y1(0)=(1/K1)[x1(0)+x1(−1)]−[K2×y1(−1)], where x1(−1) and y1(−1) are respectively the previous input and output of the low pass filter 324. A current input to low pass filter 334 is given as x0(0). A current output of the low pass filter 334 is then given as y0(0)=(1/K1)[x0(0)+x0(−1)]−[K2×y0(−1)], where x0(−1) and y0(−1) are respectively the previous input and output of the low pass filter 334. K1 is 1+(1/tan($\pi$fo/Fs2)), and K2 is 1−(1/tan($\pi$fo/Fs2)), where fo is bandwidth and Fs2 is a sampling frequency of low pass filters 324 and 334. In one embodiment, the sampling frequency of low pass filters 324 and 334 is the received signal frequency, Fs1, of 100 MHz divided by the pulse repetition interval.

The signals output from low pass filters 324 and 334 are further down sampled at decimators 326 and 336. In one embodiment, decimators 326 and 336 are configured to sample at a frequency which is the pulse repetition interval multiplied by a sampling frequency, Fs3, of all pass filters 328 and 338, divided by the received signal frequency, or (PRI×Fs3)/Fs1.

Figure 10:
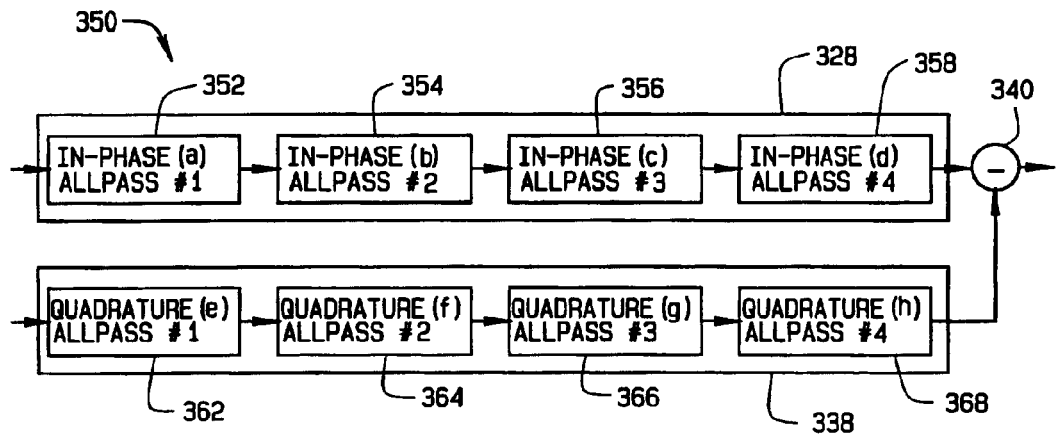
FIG. 10 is a block diagram of an all pass filter network for in-phase and quadrature components of a signal, within the mixer of FIG. 8.

FIG. 10 is a block diagram 350 of Baseband (Doppler) in-phase all-pass filter 328 and Baseband (Doppler) quadrature all-pass filter 338. In one embodiment, all-pass filter 328 and all-pass filter 338 include four cascaded second-order infinite impulse response (IIR) filters, configured to generate Baseband (Doppler) quadrature signals. Referring specifically to all-pass filter 328, it includes filter elements 352, 354, 356, and 358, sometimes referred to herein as a, b, c, and d respectively. Referring to all-pass filter 338, it includes filter elements 362, 364, 366, and 368, sometimes referred to herein as e, f, g, and h respectively.

Figure 11:
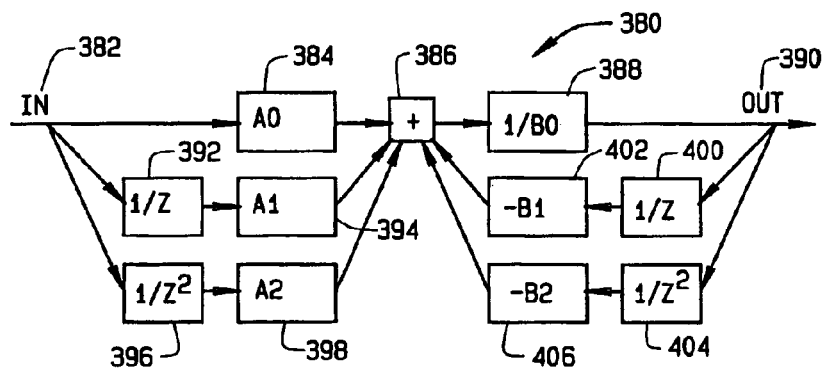
FIG. 11 is a diagram of a second order all pass filter.

FIG. 11 is a block diagram of one embodiment of a filter element 380. Element 380 is a representation of all of filter elements 352, 354, 356, 358, 362, 364, 366, and 368 (shown in FIG. 9). The following description refers specifically to element 380, consisting of delay elements 392, 396, 400, 404, summing element 386, and gain elements 384, 394, 398, 388, 402, 406. For the purposes of description the current input 382 is referred to as x(0). The current output 390 is then given as y(0)=[(A0*x(0))+(A1*x(−1))+(A2*x(−2))−(B1*y(−1))−(B2*y(−2))]/B0, where x(−1) and y(−1) are respectively the previous input and output of filter element 380, and x(−2) and y(−2) are respectively the previous-previous input and output of filter element 380. A0, A1, A2, B1, and B2 refer to the gain block coefficients.

In one specific embodiment, the above equation is applicable for all of filter elements 352, 354, 356, 358, 362, 364, 366, and 368 (shown in FIG. 9). The following are the coefficients for each filter element, the elements 352, 354, 356, 358, 362, 364, 366, and 368 being represented by a, b, c, d, e, f, g, and h respectively, and BBfreq is the base band sampling frequency, and T is 1/BBfreq. In one embodiment, floating point precision is used.

Figure 12:
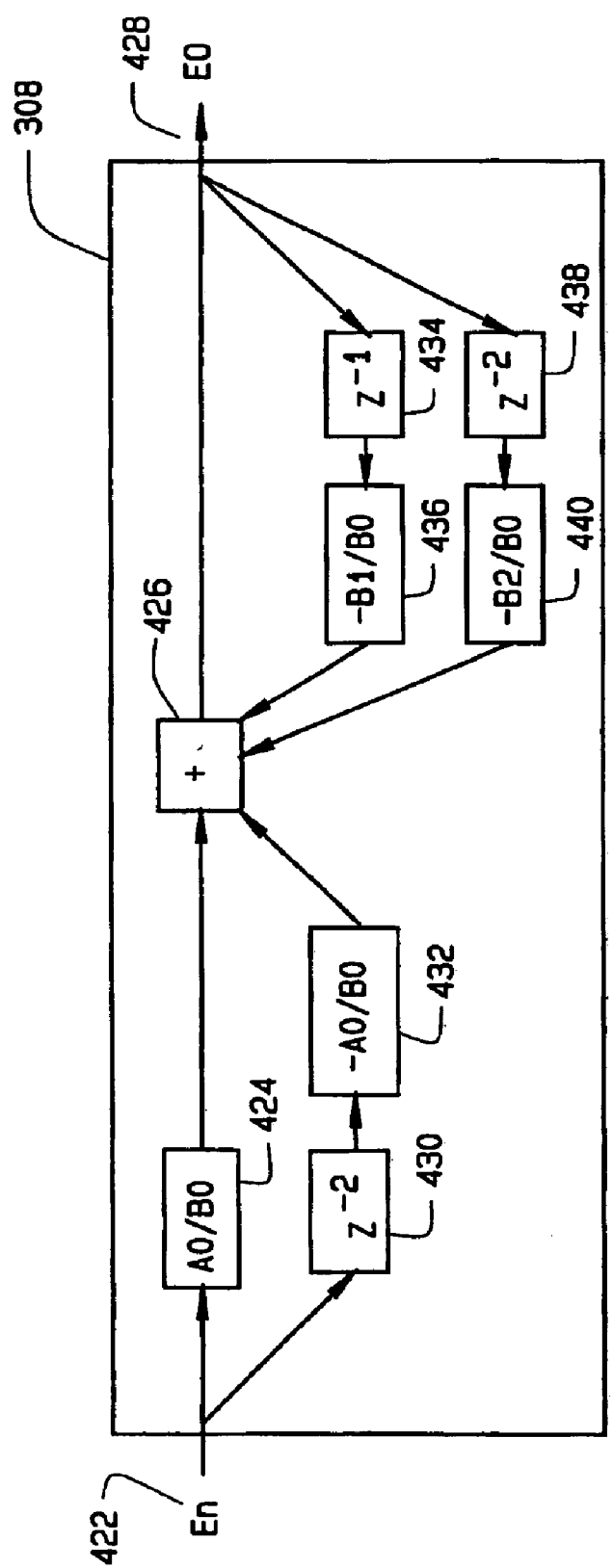
FIG. 12 is a block diagram of a swath band pass filter.

Element a
a=1.0/0.3225;
w0=57.956;
A2=(4.0/T)/T+(2.0×w0×a/T)+w0×w0;
A1=(−8.0/T)/T+2.0×w0×w0;
A0=(4.0/T)/T−(2.0×w0×a/T)+w0×w0;
B2=(4.0/T)/T−(2.0×w0×a/T)+w0×w0;
B1=(−8.0/T)/T+2.0×w0×w0;
B0=(4.0/T)/T+(2.0×w0×a/T)+w0×w0;
Element b
b=1.0/0.4071;
w0=1198.2;
A2=(4.0/T)/T+(2.0×w0×b/T)+w0×w0;
A1=(−8.0/T)/T+2.0×w0×w0;
A0=(4.0/T)/T−(2.0×w0×b/T)+w0×w0;
B2=(4.0/T)/T−(2.0×w0×b/T)+w0×w0;
B1=(−8.0/T)/T+2.0×w0×w0;
B0=(4.0/T)/T+(2.0×w0×b/T)+w0×w0;

Element c
c=1.0/0.4073;
w0=16974.0;
A2=(4.0/T)/T+(2.0×w0×c/T)+w0×w0;
A1=(−8.0/T)/T+2.0×w0×w0;
A0=(4.0/T)/T−(2.0×w0×c/T)+w0×w0;
B2=(4.0/T)/T−(2.0×w0×c/T)+w0×w0;
B1=(−8.0/T)/T+2.0×w0×w0;
B0=(4.0/T)/T+(2.0×w0×c/T)+w0×w0;
Element d
d=1.0/0.3908;
w0=259583.5;
A2=(4.0/T)/T+(2.0×w0×d/T)+w0×w0;
A1=(−8.0/T)/T+2.0×w0×w0;
A0=(4.0/T)/T−(2.0×w0×d/T)+w0×w0;
B2=(4.0/T)/T−(2.0×w0×d/T)+w0×w0;
B1=(−8.0/T)/T+2.0×w0×w0;
B0=(4.0/T)/T+(2.0×w0×d/T)+w0×w0;
Element e
e=1.0/0.3908;
w0=152.05;
A2=(4.0/T)/T+(2.0×w0×e/T)+w0×w0;
A1=(−8.0/T)/T+2.0×w0×w0;
A0=(4.0/T)/T−(2.0×w0×e/T)+w0×w0;
B2=(4.0/T)/T−(2.0×w0×e/T)+w0×w0;
B1=(−8.0/T)/T+2.0×w0×w0;
B0=(4.0/T)/T+(2.0×w0×e/T)+w0×w0;
Element f
f=1.0/0.4073;
w0=2326.03;
A2=(4.0/T)/T+(2.0×w0×f/T)+w0×w0;
A1=(−8.0/T)/T+2.0×w0×w0;
A0=(4.0/T)/T−(2.0×w0×f/T)+w0×w0;
B2=(4.0/T)/T−(2.0×w0×f/T)+w0×w0;
B1=(−8.0/T)/T+2.0×w0×w0;
B0=(4.0/T)/T+(2.0×w0×f/T)+w0×w0;
Element g
g=1.0/0.4071;
w0=32949.65;
A2=(4.0/T)/T+(2.0×w0×g/T)+w0×w0;
A1=(−8.0/T)/T+2.0×w0×w0;
A0=(4.0/T)/T−(2.0×w0×g/T)+w0×w0;
B2=(4.0/T)/T−(2.0×w0×g/T)+w0×w0;
B1=(−8.0/T)/T+2.0×w0×w0;
B0=(4.0/T)/T+(2.0×w0×g/T)+w0×w0;
Element h
h=1.0/0.3225;
w0=681178.9;
A2=(4.0/T)/T+(2.0×w0×h/T)+w0×w0;
A1=(−8.0/T)/T+2.0×w0×w0;
A0=(4.0/T)/T−(2.0×w0×h/T)+w0×w0;
B2=(4.0/T)/T−(2.0×w0×h/T)+w0×w0;
B1=(−8.0/T)/T+2.0×w0×w0;
B0=(4.0/T)/T+(2.0×w0×h/T)+w0×w0;

FIG. 12 is a block diagram of one embodiment of a swath band pass filter 308. Filter 308 is a first order band pass filter which is centered on the doppler frequency. Filter 308 receives as input a signal, En, output from IQ mixer 306 (shown in FIG. 9). Further inputs include a filter center frequency in hertz, Fc, a filter bandwidth in hertz, B, and a filter sampling frequency in hertz, Fs, which are provided.

A filtered output signal, Eo, is determined according to Eo=(A0/B0)×En−(A0/B0)×En×$Z^{-2}$−(B1/B0)×Eo×$Z^{-1}$−(B2/B0)×Eo×$Z^{-2}$. Referring specifically to filter 308, the input signal, En 422 is received and multiplied by a coefficient 424, with a value of A0/B0, and then applied to a summing element 426. The output of summing element 426 is filter output 428. Input 422 is also delayed two counts by a two sample delay element 430 whose output is multiplied by coefficient 432, with a value of −A0/B0, and then applied to summing element 432.

Output 428 is multiplied by a sample delay element 434, whose output is multiplied by a coefficient 436, with a value of −B1/B0, and then applied to summing element 432. Output 428 is also multiplied by a two sample delay element 438, whose output is multiplied by a coefficient 444, with a value of −B2/B0, and then applied to summing element 432. Coefficients for filter 308 are determined according to Wb=2πB, which is bandwidth in radians, Wu=2π×(Fc+B/2), which is an upper 3 db point of filter 308 in radians, and Wl=2π×(Fc−B/2), which is a lower 3 db point of filter 308 in radians. The coefficient A0 is 2×Fs×Wb, B0 is $(4×Fs^2)$+(2×Fs×Wb)+(Wl×Wu), B1 is (2×Wl×Wu)−$(8×Fs^2)$, and B2=$(4×FS^2)$−(2×Fs×Wb+(Wl×Wu).

Figure 13:
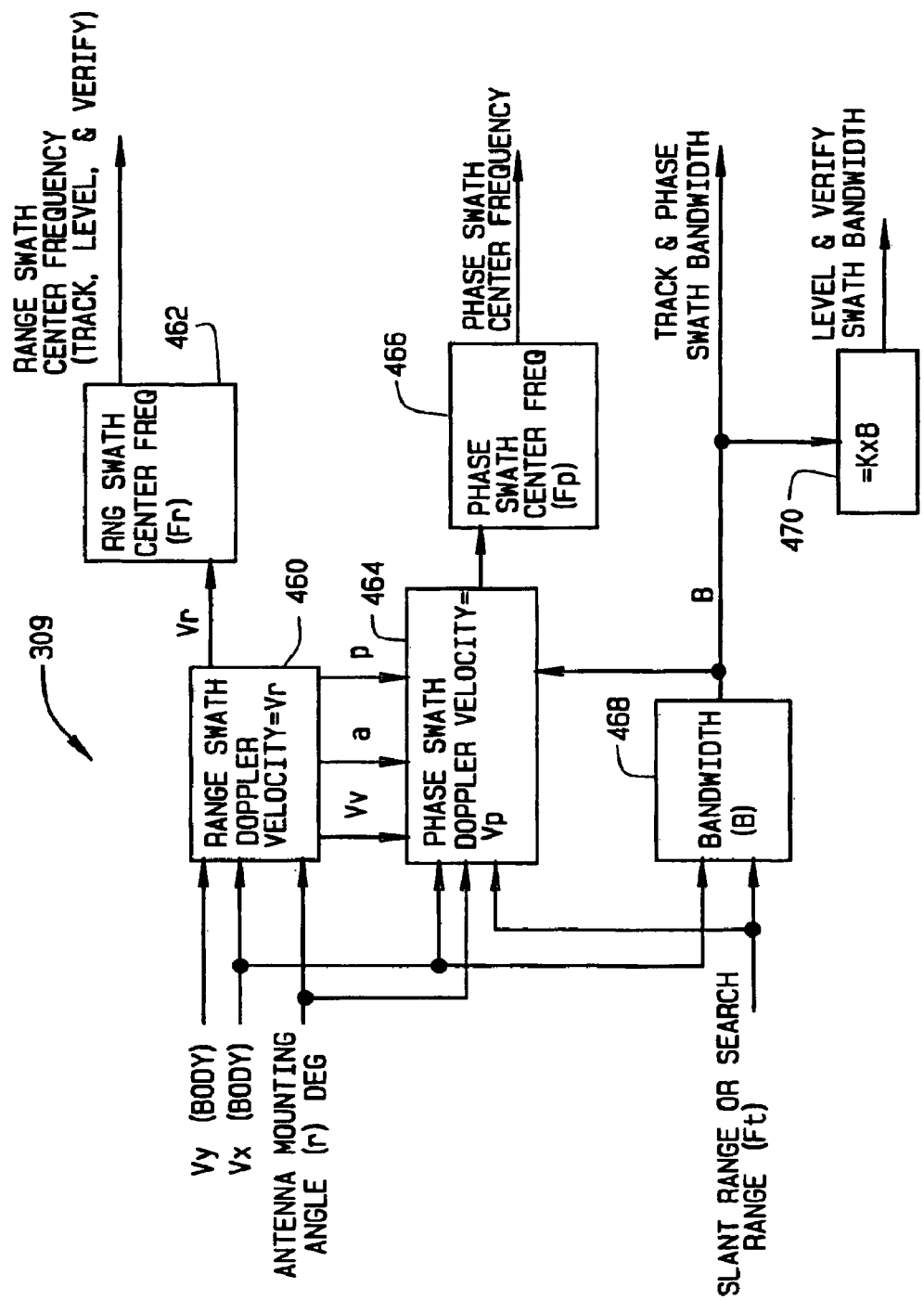
FIG. 13 is a block diagram of a filter coefficients processor.

FIG. 13 is a block diagram of a filter coefficients processor 309 (also shown in FIG. 7) which, in one embodiment, is configured to provide inputs to swath band pass filters 308 (shown in FIGS. 7 and 12). Processor 309 is configured to provide center frequencies Fc, for range swaths and phase swaths, and filter bandwidths, B, in hertz, for track and phase swaths and level and verify swaths. By controlling swath filter center frequencies, processor 309 is able to keep the doppler swath centered in the antenna beam. Also filter bandwidth is controlled. The filter bandwidth is directly related to a down track swath width on the ground such that a charge time for filter 308, inversely but directly related to bandwidth, is equal to the time it takes aircraft 2 to fly across the swath width. Therefore, filter bandwidth is matched to velocity of aircraft 2, and requires minimal processing. By knowing the antenna mounting angle, and the pitch of the aircraft, an angle to the antenna beam center is known, as described below, and a center frequency is calculated, generally, according to Fe=2×Velocity×sin(angle)/radar wavelength.

Referring specifically to processor 309, an antenna mounting angle and velocity vectors in body coordinates are input to determine a doppler velocity, Vr 460, at a range swath center frequency according to Vr=Vv×Cos(90−r−a)=Vv×Sin(a+r), where Vv=$(Vx^2+Vz^2)^{0.5}$, where Vx=velocity component on body x axis and Vz=velocity component on body z axis, a=ATan(Vz/Vx), and r is the antenna mounting angle. A range swath center frequency, Fr 462 is determined according to Fr=2×Vr/L, where L is a wavelength, and in one specific embodiment, is 0.2291 feet. A velocity component on body y axis, Vy, is not used to center swath in antenna beam as the component has a value of zero since the antenna is fixed to a y axis of the body.

Processor 309 is also configured to determine a phase swath doppler velocity, Vp 464, which is delayed behind the range swath by a time equal to the range processing delay. Vp is calculated as Vp=Vv×Cos(90−(r−p)−a)=Vv×Sin(a+r−p), where Vv=$(Vx^2+Vz^2)^{0.5}$, where Vx=velocity component on body x axis and Vz=velocity component on body z axis, a=ATan(Vz/Vx), r is the antenna mounting angle, and p=(T×Vx/H)×(180/π) in degrees, where T=1/πB and is a delay through range swath filter, T×Vx is vehicle movement on body X axis, B is the swath bandwidth, and H is altitude in feet. Phase swath center frequency 466 is calculated according to Fp=2×Vp/L, where L is a wavelength, and in one specific embodiment, is 0.2291 feet.

Figure 14:
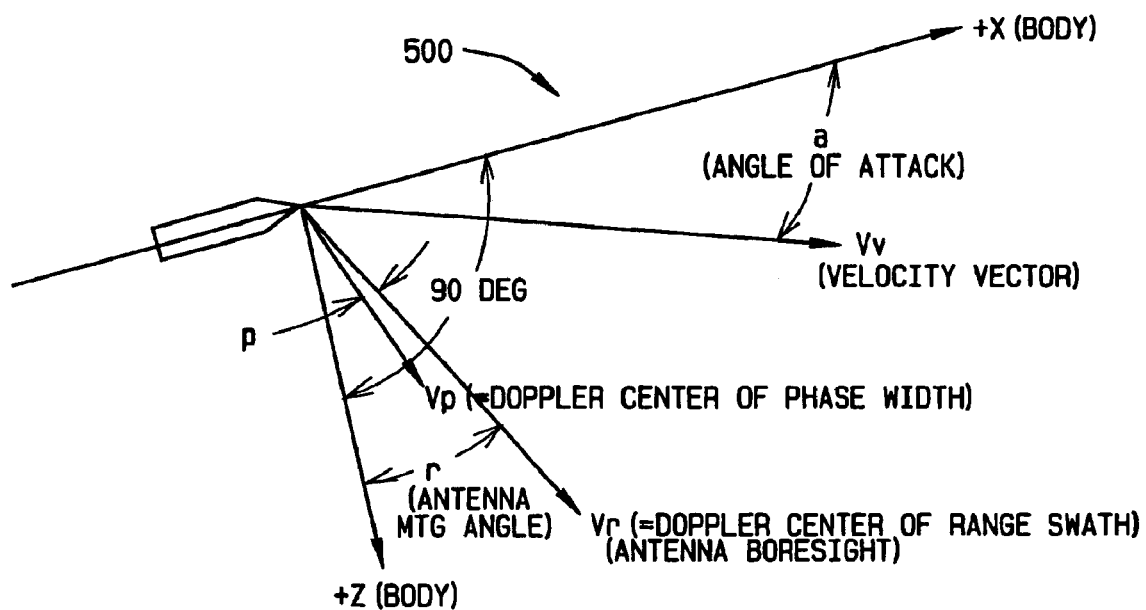
FIG. 14 is a velocity vector diagram.

Processor 309 is configured to determine a track and phase swath bandwidth, B 468 according to B=Vx/(0.6(H)$^{0.5}$) in hertz, where H is altitude in feet. A level and verify swath bandwidth 470 is calculated as a ratio of level and verify bandwidths to track and phase bandwidths, K, multiplied by track and phase swath bandwidth 468. FIG. 14 is a vector diagram 500 which illustrates the calculations above described. In one embodiment, if the radar is in a range search mode, search range instead of altitude is used to calculate bandwidth.

Together, filters 308 and processor 309 automatically configure the radar doppler filter center frequency and bandwidth to achieve better radar performance over varying terrain and varying aircraft altitude, roll, and pitch than known systems. The determined center frequency operates to maintain the radar swath at an approximate center of the antenna beam. The calculated bandwidth is a bandwidth that controls the track swath width on the ground, and is calculated such that the filter time constant is equal to the time it takes the vehicle to move a corresponding swath width distance. The bandwidth corresponds to a time over the target and provides information as to how long a second swath lags a first swath. Phase channel swaths are set behind in position to account for a processing time of range processor 242 (shown in FIG. 7). The calculations of center frequency and bandwidth provide a mechanism for keeping a swath slightly in front of the aircraft such that a positive doppler shift is realized.

Figure 15:
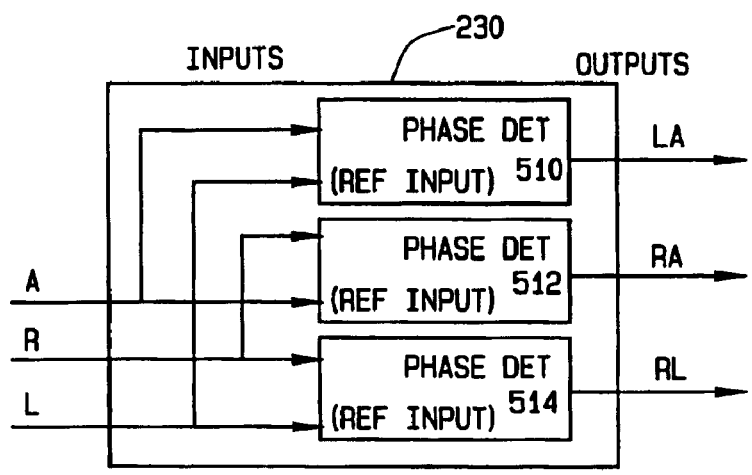
FIG. 15 is a block diagram of a phase processor including three phase detectors.

FIG. 15 is a block diagram of a phase processor 230 (also shown in FIGS. 6 and 7). Phase processor 230 includes three phase detectors 510, 512, and 514. In one embodiment, phase detectors 510, 512, and 514 are configured with an input and a reference input, and further configured to determine a phase difference between the input and the reference input. Phase processor 230 is configured to receive processed radar return data, from swath band pass filters 308 (shown in FIG. 7), as described above, for all of a left channel, a right channel, and an ambiguous channel. Determination of phase difference in return data for the three channels allows for an accurate position determination for an object from which radar data was returned.

In the embodiment shown, phase detector 510 is configured to receive ambiguous channel return data as input, with left channel return data as a reference, and further configured to determine and output a phase difference between the left and ambiguous channels. Phase detector 512 is configured to receive right channel return data as input, with ambiguous channel return data as a reference, and further configured to determine and output a phase difference between the ambiguous and right channels. Phase detector 514 is configured to receive right channel return data as input, with left channel return data as a reference, and further configured to determine and output a phase difference between the left and right channels.

Figure 16:
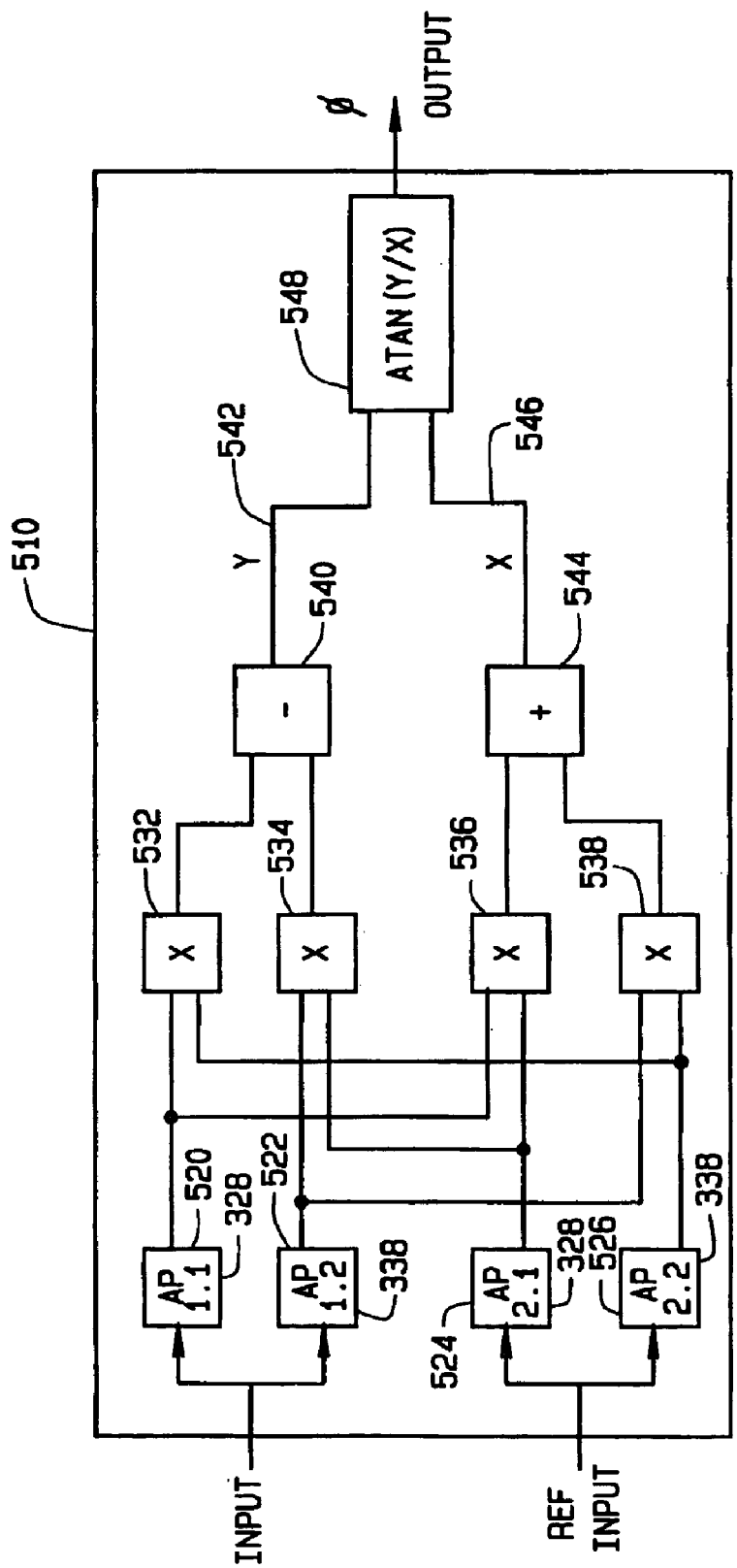
FIG. 16 is a block diagram of one phase detector from FIG. 15.

FIG. 16 is a block diagram of phase detector 510 (shown in FIG. 15). Phase detectors 512 and 514 are of the same configuration. Phase detector 510 incorporates a plurality of in-phase all pass filters 328 and quadrature all pass filters 338 (shown above in FIGS. 9 and 10). Specifically, an input is received at a first in-phase filter 520 (AP1.1) and a first quadrature filter 522 (AP1.2). A reference input is received at a second in-phase filter 524 (AP2.1) and a second quadrature filter 526 (AP2.2). A multiplier 532 is configured to multiply outputs from filters 520 and 526. Another multiplier 534 is configured to multiply outputs from filters 522 and 524. A third multiplier 536 is configured to multiply outputs from filters 520 and 524. A fourth multiplier 538 is configured to multiply outputs from filters 522 and 526. An output of multiplier 534 is subtracted from an output of multiplier 532 with a subtraction element 540 which produces a Y output 542. An output of multiplier 536 is added to an output of multiplier 538 with an addition element 544 which produces an X output 546. A processing element 548 is configured to determine an arctangent of Y output 542 divided by X output 546, which is the phase difference, in radians, between the input and the reference input.

In mathematical form, Y output 542 is calculated as Y=(AP1.1×AP2.2)−(AP1.2×AP2.1), X output 546 is calculated as X=(AP1.1×AP2.1)+(AP1.2×AP2.2), and the phase difference is ATAN (Y/X).

In one embodiment, in-phase filters 520 and 524 and quadrature filters 522 and 526 include the four cascaded second order infinite impulse response (IIR) filters as described in FIG. 10. Further, in the embodiment, filters 520 and 524 are configured to include in-phase filter elements 352, 354, 356, and 358, (shown in FIG. 10) and are configured with coefficients which correspond to elements a, b, c, and d respectively as described above. Referring to quadrature filters 522 and 526, they are configured to include quadrature filter elements 362, 364, 366, and 368, (shown in FIG. 10) and are configured with coefficients which correspond to elements e, f, g, and h respectively as described above.

Figure 17:
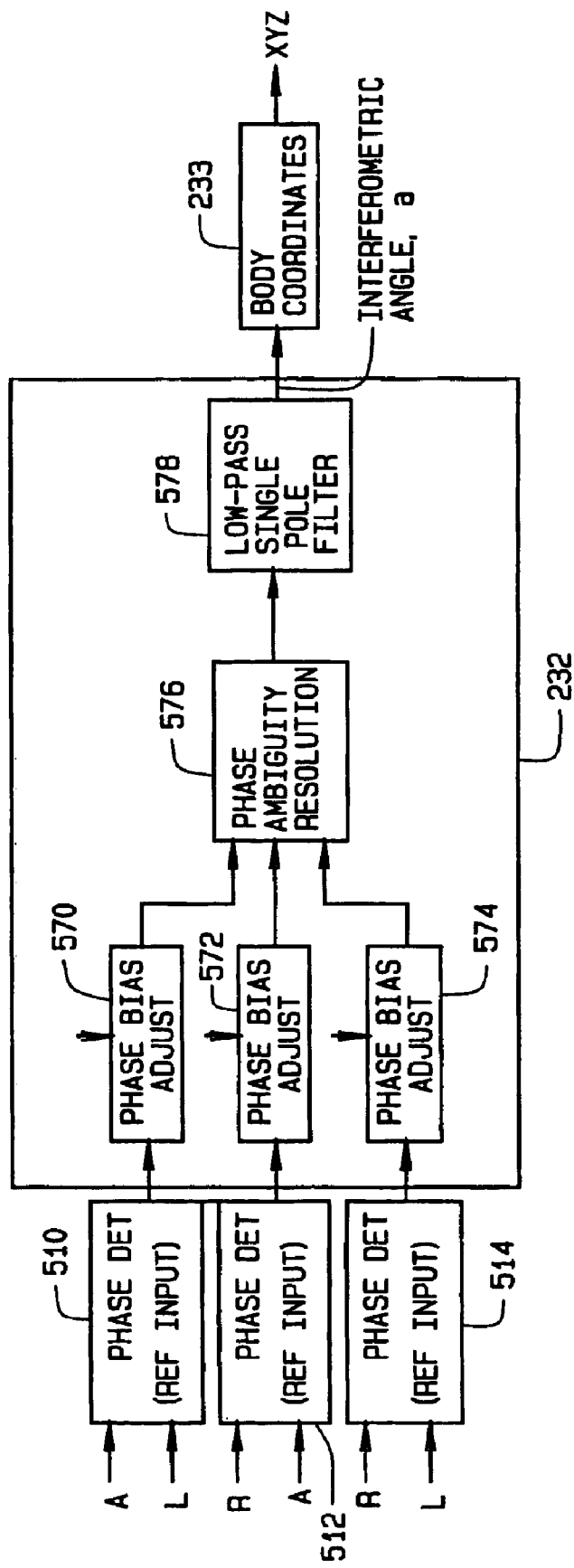
FIG. 17 is a block diagram of an interferometric angle resolver.

Once phase differences between the right, left, and ambiguous channels has been determined, as described above, the phase differences are used, in one embodiment, to determine and interferometric angle to the target. FIG. 17 is a block diagram of phase ambiguity processing unit 232 (also shown in FIG. 6). In one embodiment, phase ambiguity processing unit 232 is configured to receive an electrical phase difference between the ambiguous channel and the left radar channel from phase detector 510, an electrical phase difference between the right channel and the ambiguous radar channel from phase detector 512, and an electrical phase difference between the right channel and the left radar channel from phase detector 514.

Phase ambiguity processing unit 232 includes a phase bias adjust unit 570 which provides a phase shift value which compensates for phase shifts which occur in the routing of the radar signals, from receipt at an antenna and through cabling and processing areas within aircraft 2. It is accepted that most phase shifting of signals occurs due to cabling for the routing of signals. Phase bias adjust 570 compensates for the ambiguous channel with respect to the left radar channel. Phase bias adjust 572 compensates for the right channel with respect to the ambiguous radar channel. Phase bias adjust 574 compensates for the right channel with respect to the left radar channel.

The compensated phase difference signals are received at a phase ambiguity resolver 576. In one embodiment, phase ambiguity resolver 576 is implemented using software, and determines a physical (interferometric) angle to a target which originally reflected the radar signals received. Phase ambiguity resolution is further described below. After resolution of phase ambiguous signals, the physical angle signal is filtered utilizing a low-pass filter 578, and an angular position of the target with respect to aircraft body coordinates (X,Y,Z) is determined from the physical angle to the target using body coordinates processor 233 (further described below). The determined position, in one embodiment, is 90 degrees minus a half angle of a cone whose axis is a Y-axis of the body of aircraft 2. The target is on the cone surface, therefore providing the subtraction from 90 degrees above described.

TABLE 4

Phase Ambiguity Resolution Matrix

| $\theta_{LA}$ | $\theta^1 = \theta_{LA}$ $\Phi = \sin^{-1}(\theta^1/K1)$ | $\theta^1 = (\theta_{LA} - 360)$ $\Phi = \sin^{-1}(\theta^1/K1)$ | $\theta^1 = (\theta_{LA} + 360)$ $\Phi = \sin^{-1}(\theta^1/K1)$ | | |
|---|---|---|---|---|---|
| $\theta_{AR}$ | $\theta^1 = \theta_{AR}$ $\Phi = \sin^{-1}(\theta^1/K2)$ | $\theta^1 = (\theta_{AR} - 720)$ $\Phi = \sin^{-1}(\theta^1/K2)$ | $\theta^1 = (\theta_{AR} - 360)$ $\Phi = \sin^{-1}(\theta^1/K2)$ | $\theta^1 = (\theta_{AR} + 360)$ $\Phi = \sin^{-1}(\theta^1/K2)$ | $\theta^1 = (\theta_{AR} + 360)$ $\Phi = \sin^{-1}(\theta^1/K2)$ |
| $\theta_{LR}$ | $\theta^1 = \theta_{LR}$ $\Phi = \sin^{-1}(\theta^1/K3)$ | $\theta^1 = (\theta_{LR} - 720)$ $\Phi = \sin^{-1}(\theta^1/K3)$ | $\theta^1 = (\theta_{LR} - 360)$ $\Phi = \sin^{-1}(\theta^1/K3)$ | $\theta^1 = (\theta_{LR} + 360)$ $\Phi = \sin^{-1}(\theta^1/K3)$ | $\theta^1 = (\theta_{LR} + 360)$ $\Phi = \sin^{-1}(\theta^1/K3)$ |
| $\theta_{LR}$ | | | | $\theta^1 = (\theta_{LR} - 1080)$ $\Phi = \sin^{-1}(\theta^1/K3)$ | $\theta^1 = (\theta_{LR} + 1080)$ $\Phi = \sin^{-1}(\theta^1/K3)$ |

Table 4 is a phase ambiguity resolution matrix which is utilized, in one embodiment, to determine a physical angle to a target based upon electrical phase differences. A calculated electrical angle phase difference, θ, is equivalent to $[(360 \times S)/\lambda] \times \sin(\Phi)$ or $K \times \sin(\Phi)$, where $\Phi$ is the physical angle of the target in aircraft coordinates, S is a separation between the two antenna elements in feet, and λ is a wavelength of the radar signal in feet. In one particular embodiment, separation between the left antenna and the ambiguous antenna is 0.2917 feet (3.5 inches), separation between the ambiguous antenna and the right antenna is 0.7083 feet (8.5 inches), and the separation between the left antenna and the right antenna is 1 foot (12 inches). In the embodiment, the wavelength of the radar is 0.2291 feet. Therefore, in the embodiment, and referring to Table 4, K1 is (360×0.2917)/0.2291, or about 458.4, K2 is (360×0.7083)/0.2291, or about 1113.25, and K2 is (360×1)/0.2291, or about 1571.64. Physical angles are then determined according to $\Phi = \sin^{-1}(\theta/K)$.

As antenna separation, radar wavelength, and aircraft position may all affect a timing of radar signals received at the various antennas, phase differences, which are determined as described above, will change at varying rates. In the embodiment illustrated in Table 4, physical angles are calculated for multiple electrical phase differences, and the true physical angle is a solution which provides approximately the same physical angle calculation, in each of the three rows (within a couple of degrees). Using the first antenna pairing (left and ambiguous), and based on antenna separation, three possible physical angles are determined from the electrical phase difference received from phase detector 510. As the second antenna pairing (ambiguous and right) are further apart, five possible physical angles are determined. The last antenna pairing (left and right) are the furthest apart, therefore seven possible physical angles are determined. As described above, one of the physical angles from each group of physical angle calculations, will be roughly equivalent, thereby providing an unambiguous physical angle solution. In such a system it is important to note that separation in antenna pairing cannot be a multiple of radar wavelength.

Figure 18:
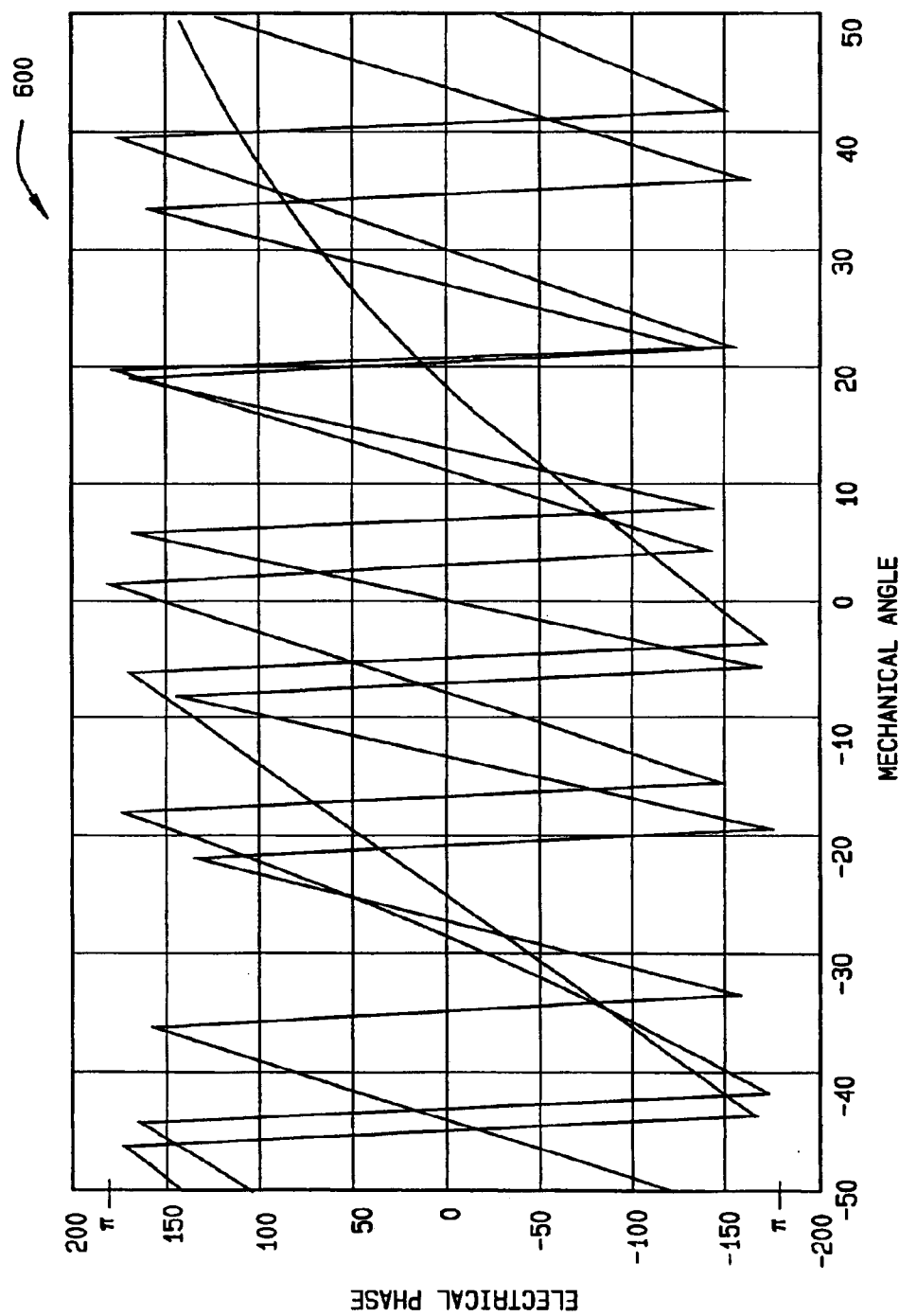
FIG. 18 is a chart illustrating varying electrical phase differences between three antenna pairings.

FIG. 18 is a chart 600 illustrating varying electrical phase differences between three antenna pairings. Chart 600 helps to illustrate the process above described. As varying electrical phase differences between the three antenna pairings are charted, a single mechanical (physical) angle can be determined from the varying electrical phase difference plots for each antenna pairing. That is, for a physical angle, there is one solution which provides a phase difference for each radar channel grouping which is approximately equivalent to the calculated phase differences for the channel groupings.

Figure 19:
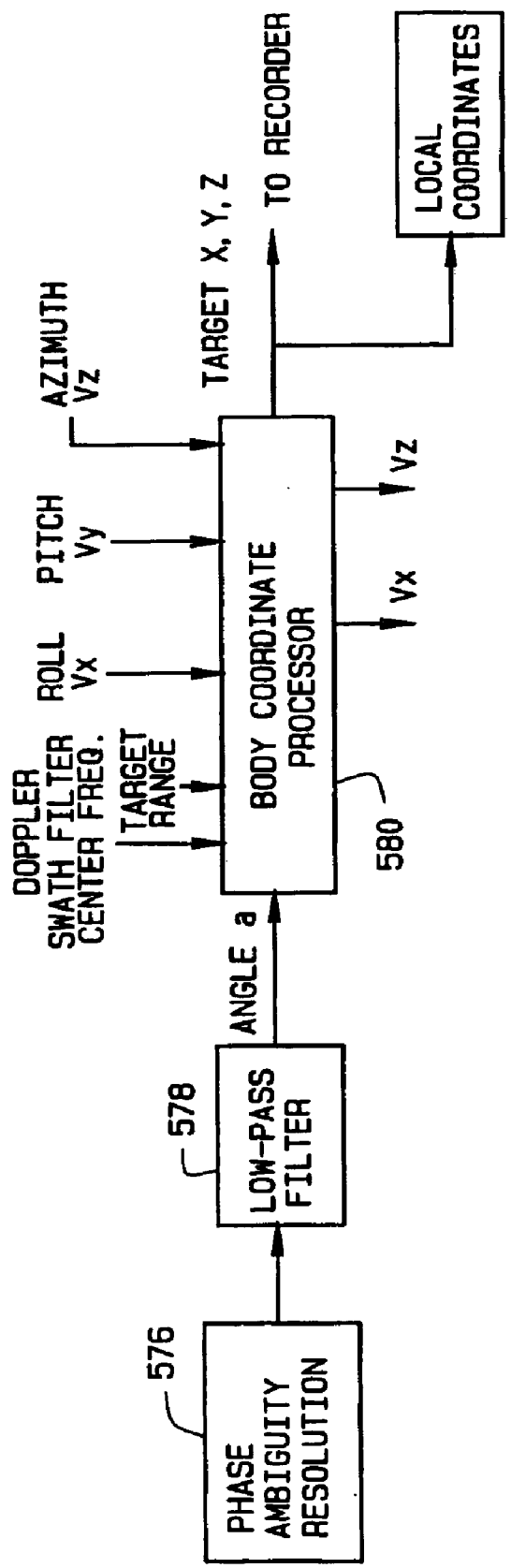
FIG. 19 is a block diagram which illustrates inputs to a body coordinate processor.

FIG. 19 is a block diagram which illustrates inputs to and outputs from body coordinate processor 233 (also shown in FIG. 6). Processor receives the phase detector angle to the target from phase ambiguity resolver 576 via low pass filter 578 (described above in FIG. 17). Processor 233 further receives the doppler swath filter center frequency, and the filter bandwidth, a range to the target in feet, and velocity in pitch, roll and azimuth. Utilizing the processing described below, processor 233 is configured to determine a distance to the target in aircraft body coordinates. In one embodiment, the distance is determined in feet for aircraft body coordinates x, y, and z. Processor 233 further determines a velocity with respect to aircraft body coordinates in x and z.

Figure 20:
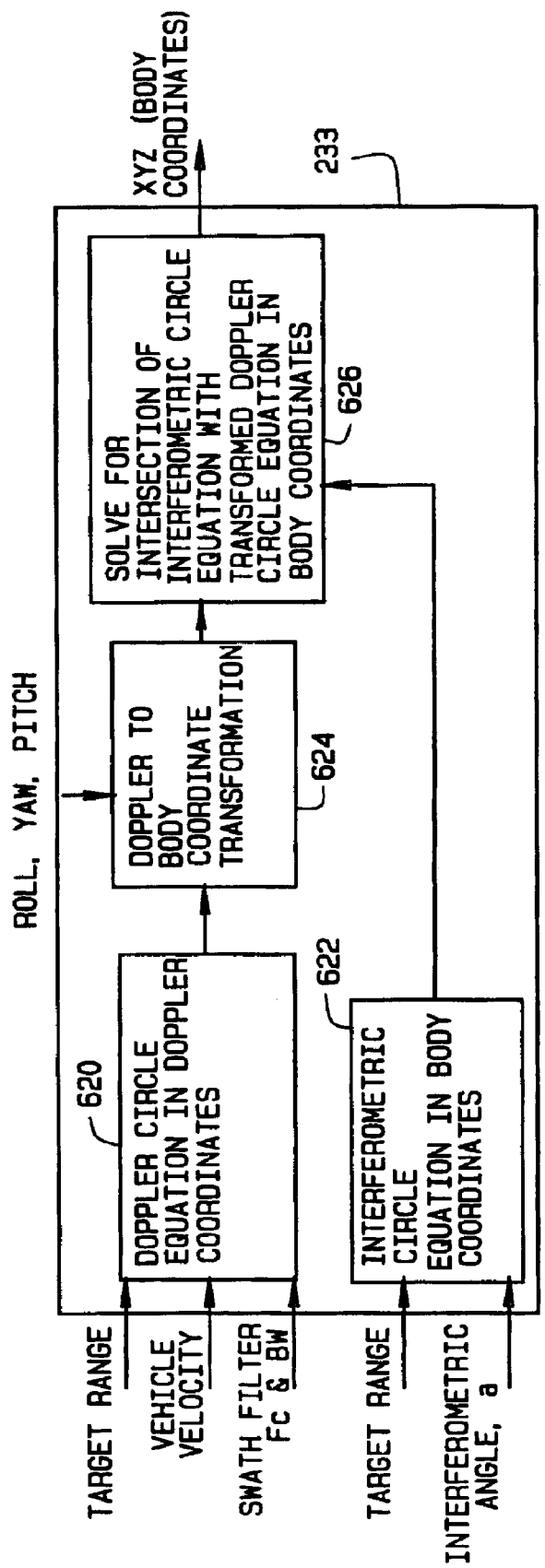
FIG. 20 is a block diagram of the body coordinate processor of FIG. 19.
Figure 21:
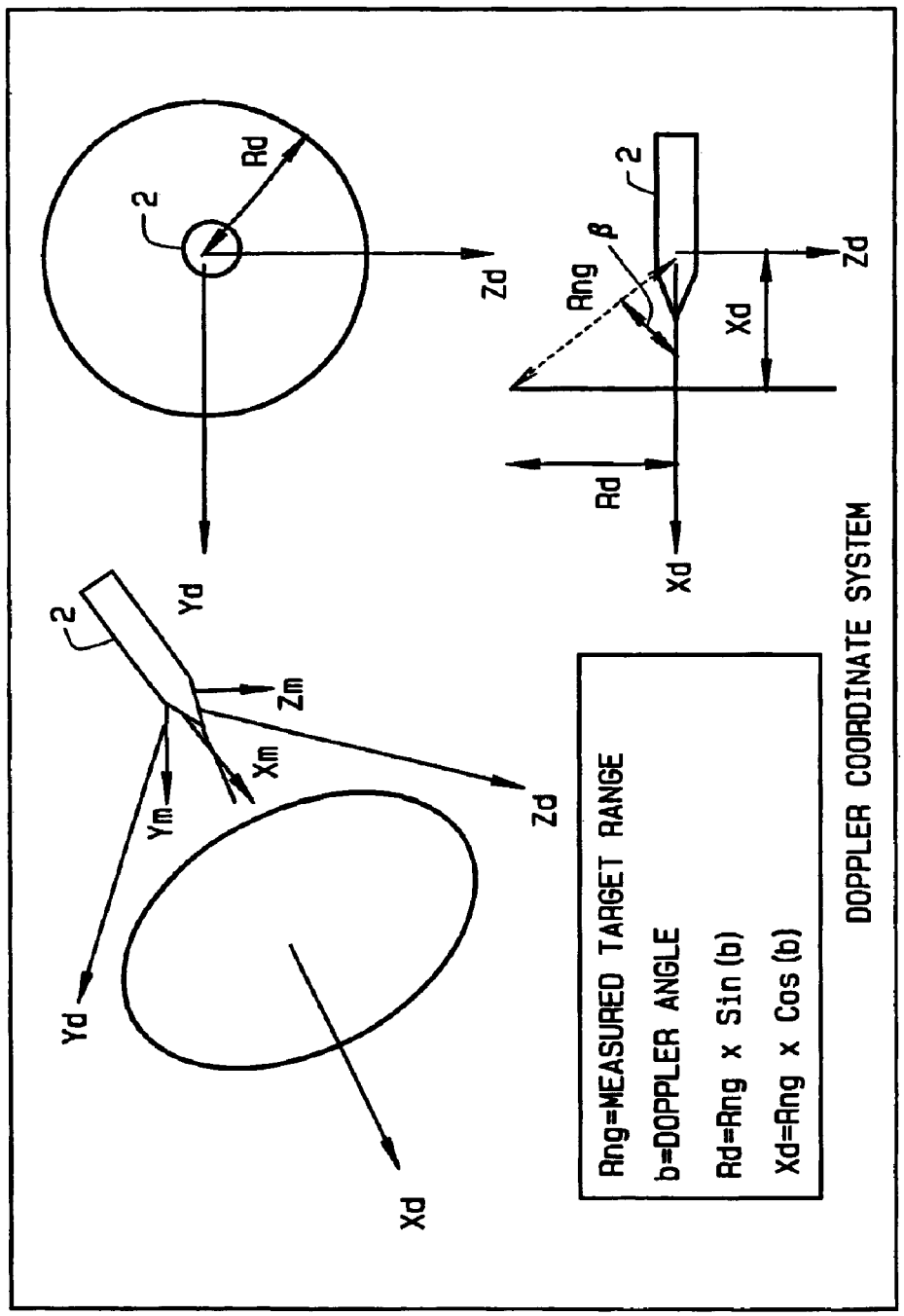
FIG. 21 is an illustration of the derivation of a doppler circle.

FIG. 20 is a detailed block diagram of body coordinate processor 233 of FIG. 19. Target range, vehicle velocity in pitch, roll, and azimuth, plus the swath filter center frequency and bandwidth are input into a doppler circle equation processor 620, which is configured to determine doppler circle equations. The circle is determined using the swath filter center frequency equation $Fc = [2 \times V \times \cos(\beta)]/L$, where V is velocity, L is wavelength, and β is an angle with respect to a line of flight, which is determined through manipulation of the above equation. Therefore, $\beta = \cos^{-1}((Fc \times L)/(2 \times V))$. A radius of the doppler circle, Rd, is calculated according to Rd=target range ×sin (β). A distance of the doppler circle, Xd, from the aircraft is determined according to Xd=target range×cos (β) (FIG. 21 is provided to illustrate the equations with regard to the doppler circle as derived above.

An example calculation is used to further illustrate. Inputs to doppler circle equation processor 620 include a range to target of 2000 feet, a velocity of 800 feet/second, a wavelength of 0.229 feet, and a doppler swath filter center frequency of 1213 Hertz. The angle with respect to the aircraft line of flight, β, is determined as $b = \cos^{-1}((1213 \times 0.229)/(2 \times 800)) = 80$ degrees. The doppler circle radius, Rd, is 2000×sin(80)=1969 feet, and distance of the doppler circle, Xd, is 2000×cos(80) 347 feet.

Figure 22:
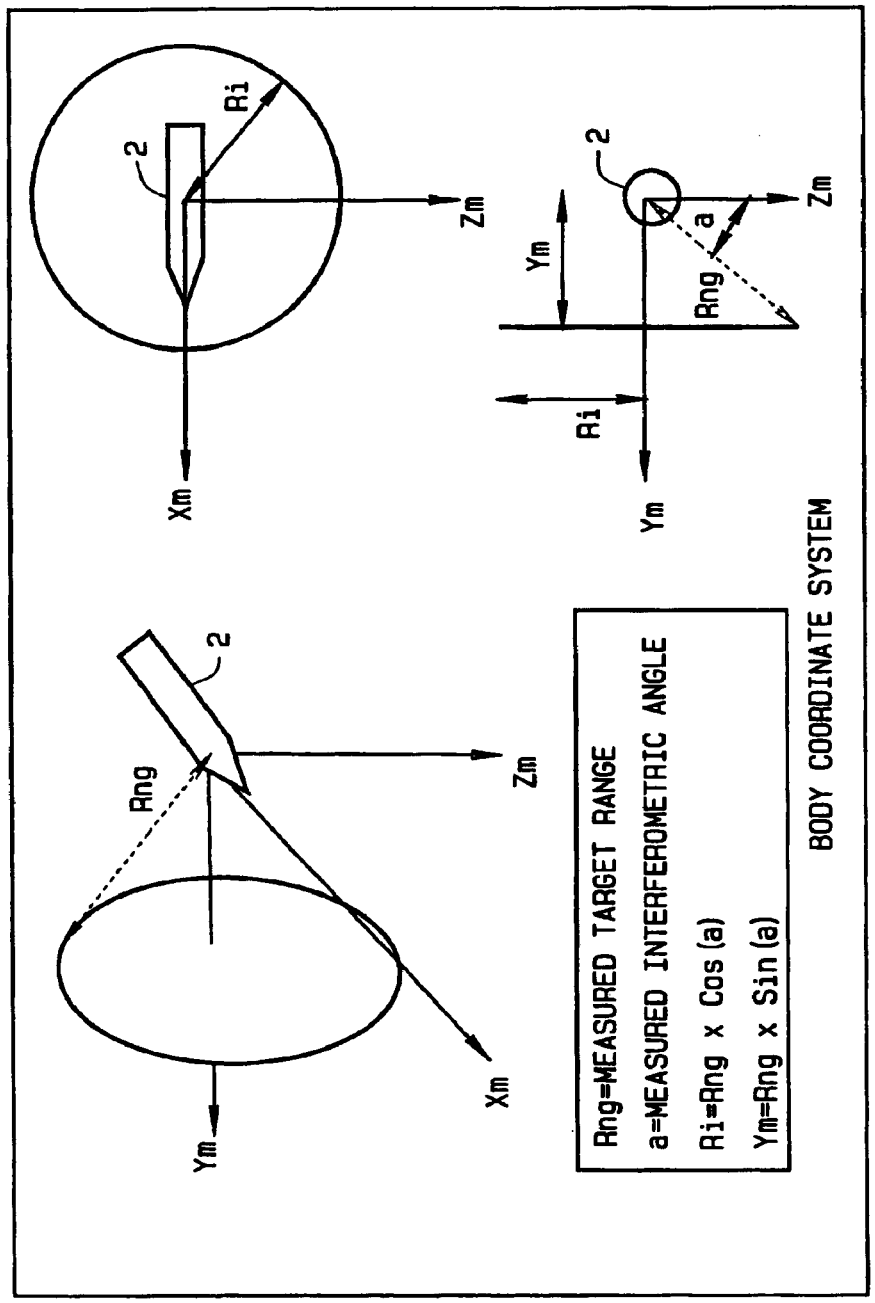
FIG. 22 is an illustration of the derivation of an interferometric circle.

Again referring to FIG. 20, processor 233 further includes an interferometric circle equation processor 622 which is configured to determine interferometric circle equations in body coordinates. Processor 622 receives as input a target range and the interferometric angle (or phase detector angle), a, to the target as calculated by phase ambiguity resolver 576 (shown in FIG. 17). An interferometric circle radius, Ri, is calculated as Ri=target range×cos(a). A location of the interferometric circle on a Yin axis is determined as Ym=target range ×sin(a). Referring to the example above, and including an interferometric angle input of 15 degrees, the radius of the interferometric circle, Ri, is 2000×cos(15), or 1932 feet. The location of the circle on the Ym axis, Ym is 2000×sin(15), or 518 feet. FIG. 22 is provided to illustrate the equations with regard to the interferometric circle as derived above.

Again referring to FIG. 20, a doppler to body coordinate transformation processor 624 within processor 233 uses the doppler circle equation, and pitch, roll, and yaw inputs to transform the doppler circle into body coordinates. Finally, at intersection processor 626 which is configured to solve equations to determine an intersection of the interferometric circle equation with the doppler circle equation that has been transformed into body coordinates.

In one embodiment, transforming begins by a determination of a velocity vector in body coordinates, from navigation data, N, (in pitch, roll, and yaw) according to $$\begin{vmatrix} V_X^N \\ V_Y^N \\ V_Z^N \end{vmatrix} |TRANSPOSE\ MATRIX| = \begin{vmatrix} V_X^{BODY} \\ V_Y^{BODY} \\ V_Z^{BODY} \end{vmatrix},$$

where the transpose matrix is given by $$\begin{vmatrix} \cos(\psi)\cos(\theta) & -\sin(\psi)\cos(\theta) & \sin(\theta) \\ \cos(\psi)\sin(\theta)\sin(\phi)-\sin(\psi)\cos(\phi) & -\sin(\psi)\sin(\theta)\sin(\phi)-\cos(\psi)\cos(\phi) & -\cos(\theta)\sin(\phi) \\ \cos(\psi)\sin(\theta)\sin(\phi)+\sin(\psi)\sin(\phi) & \cos(\psi)\sin(\phi)-\sin(\psi)\sin(\theta)\sin(\phi) & -\cos(\theta)\cos(\phi) \end{vmatrix},$$

and $\Psi$ is azimuth, $\theta$ is pitch and $\phi$ is roll.

Velocity unit vectors (direction cosines) are given in body coordinates as $a_x=V_x/(V_x^2+V_y^2+V_z^2)^{1/2}$, $a_y=V_y/(V_x^2+V_y^2+V_z^2)^{1/2}$, and $a_z=V_z/(V_x^2+V_y^2+V_z^2)^{1/2}$.

Intersection processor 626 is configured to determine body coordinates which are calculated as $X_1=D\times a_x$, $Y_1=D\times a_y$, $Z_1=D\times a_z$, where the velocity vector D, is given as $R\times\cos(\beta)$, and $\beta=\cos^{-1}(Fc\times L/2\times V)$. B is the doppler cone angle, Fc is the swath filter center frequency, R is the range to the target, V is $(V_x^2+V_y^2+V_z^2)^{1/2}$, and L is the wavelength of the radar.

A position of the target in body coordinates is also calculated by intersection processor 626 as $y=R\times\sin(A)$, where A=measured phase angle in body coordinates. The coordinate z is calculated as $z=(-b\pm(b^2-4ac)^{1/2})/(2\times a)$, where $a=1+(Z_1/K_1)^2$, $b=(-4Z_1\times KT/(2X_1)^2)$, and $c=(KT/2X_1)^2-KA$. KA is calculated as $(R\times\cos(A))^2$, KB is calculated as $(R\times\sin(B))^2$, $KY=(y-y_1)^2$, and KT is calculated as $KT=KA+KY-KB+X_1^2+Z_1^2$. The coordinate x is calculated according to $x=(KA-z^2)^{1/2}$.

Figure 23:
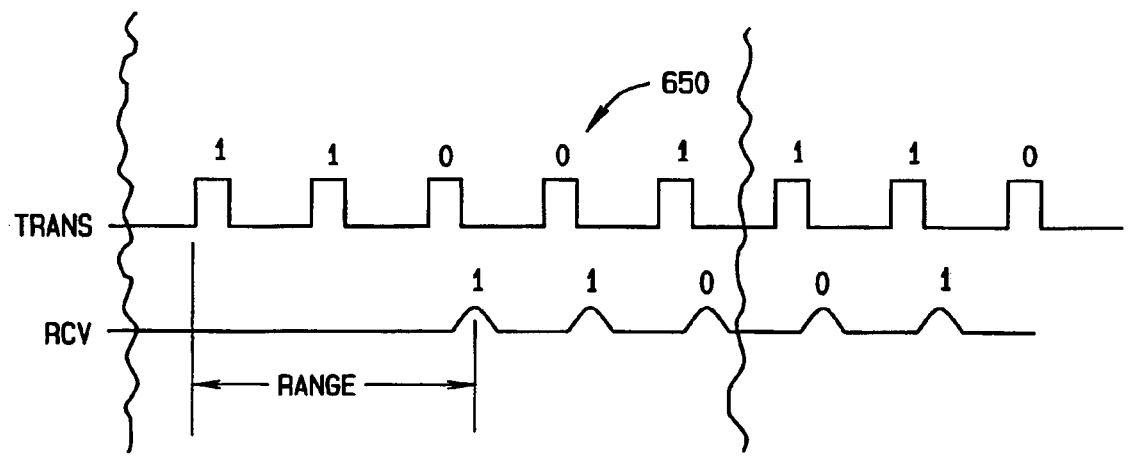
FIG. 23 is a diagram illustrating barker coded transmit and receive pulses.

While determining a position of a radar target with respect to, for example, an aircraft body, as described in detail above is necessary, it is also necessary in certain application to determine a range to a target. As is well known, in high altitude radar operations, it is possible that multiple radar transmit pulses will be transmitted before a return pulse is received. This is sometimes referred to as the ambiguous radar range problem. FIG. 23 illustrates one solution to the problem, the solution being to modulate radar transmit pulses 650 with a phase code. Implementation of the code, which involves a phase shifting of individual pulses of radar transmit pulses 650, allows a synchronization of transmit pulses 650 with return pulses 652 which are received by a radar. Synchronization of the phase encoded radar pulses with the returned pulses is sometimes referred to as correlation.

Figure 24:
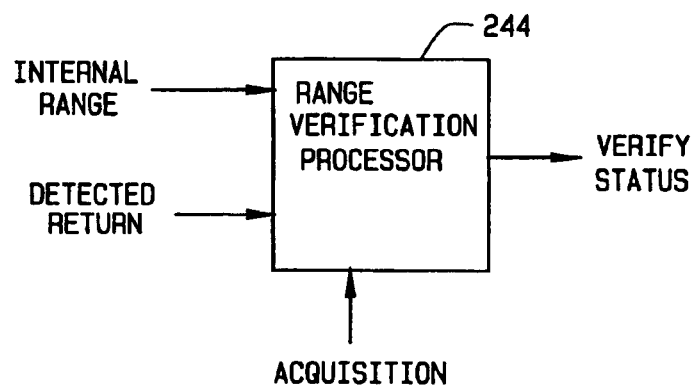
FIG. 24 is a block diagram illustrating inputs to and outputs from a range verification processor

In one embodiment, correlation is accomplished by implementation of a encoded radar scheme, and by looking for deviations in the return pulses from a reference, or starting altitude. FIG. 24 is a block diagram illustrating inputs to and outputs from range verification processor 244 (also shown in FIGS. 6 and 7). In one embodiment, verification processor 244 is configured to step through encoded return signals and determine a main lobe of the return signal to determine a range to, for example, a target.

Verification processor 244 is configured to receive as inputs, a detected radar return, which has been gated and demodulated. Verification processor 244 also receives as input a present internal range to the target, and a command from the radar search logic to be in either of a search mode or an acquisition mode. Verification processor 244 is configured with a variable mainlobe threshold factor (described below) and a verification dwell time, which is the time processor 244 is allocated to determine if an amplitude of a return signal exceeds the threshold factor. A verify status output is set true of the amplitude of the radar return exceeds the threshold value, thereby signifying that the transmit radar pulses and return radar pulses are correlated. If not correlated, the verify status output is false, and processor 244 provides a corrected range position to range processor 242 (shown in FIG. 7).

Figure 25:
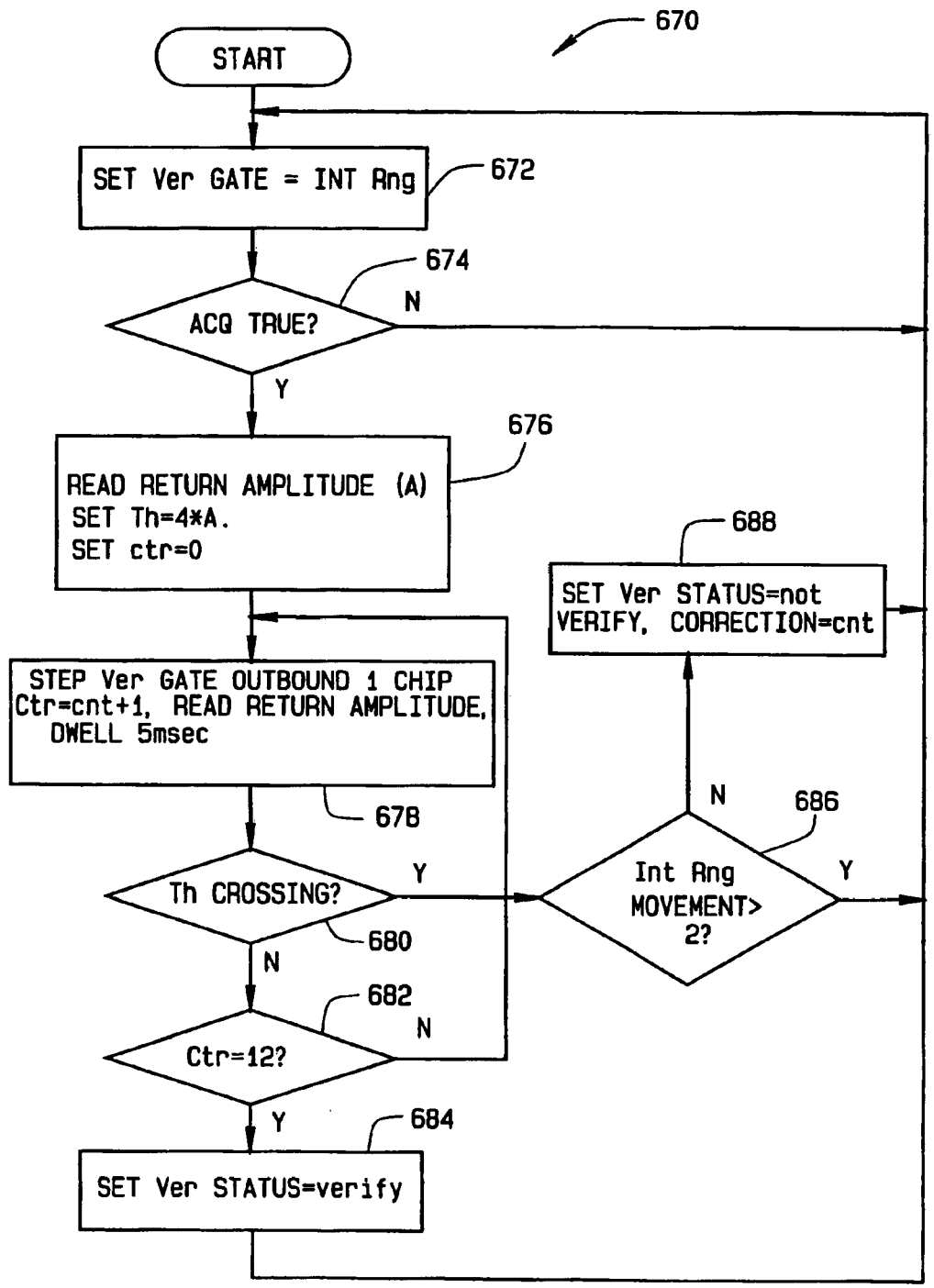
FIG. 25 is a flowchart illustrating a range verification method.

FIG. 25 is a flowchart 670 illustrating one embodiment of an autocorrelation process performed by processor 244. Referring to flowchart 670, a verify gate is set 672 to an internal range, from one of track or search. It is then determined whether a radar return is acquired 674 from within a verify gate, the gate attempting to align the chips of transmitted and received codes. If no target is acquired 674, then processor 244 is configured to return to reset the verify gate. If a target is acquired 674, then an amplitude of the return is determined 676. In addition, the threshold factor is set to, for example, four times the determined amplitude and a counter is set to zero. The verify gate is stepped 678 out one chip of the code, the counter is incremented, and a dwell time passes before an amplitude of a return is again read. If the amplitude read is determined 680 not to be above the threshold factor, the counter is checked 682. If the counter is determined to be less than one less than the number of chips within the barker code, the verify gate is again stepped 678, and the steps are repeated, until the threshold factor is exceeded or the counter is equal to one less than the number of chips within the code. In one exemplary embodiment, a thirteen bit code is used, therefore the counter has a maximum value of twelve. In one embodiment barker codes are used for encoding the radar signals.

If the threshold factor is not exceeded, the original acquisition is an acquisition on the main lobe of the return, and the transmit and return codes are aligned, and the internal range as determined by processor 244 is correct, resulting in a verification status being set 684 to verify.

If the threshold factor is exceeded, then the transmit and return codes have become aligned. If the internal range has been moved 686 more than two range gates, the process illustrated by flowchart 670 begins anew. If there is a less than two range gate movement 686, the search logic of the radar is set 688 to not verify, and is moved by the value of the counter, in order to align the transmit and receive barker codes. The process illustrated by flowchart 670 again begins. The continuous processing of encoded radar transmit and return signals by processor, provides a favorable solution to the known radar range ambiguity problem by constantly stepping through the codes to ensure receipt of an unambiguous radar range return.

In one embodiment, the above described verification processing for radar range ambiguity is applied continuously during flight, not just during initial acquisition: In utilization of such a system, the verification processing is applied in order to resolve range ambiguity during acquisition, but the processing is continuously applied after acquisition, throughout the flight. The continuous processing is done in order to ensure that if the transmit and received pulses become misaligned (loose correlation) the misalignment will both detected and corrected. Loss of correlation could occur due to, for example, a range discontinuity due to severe aircraft rolls or a sudden change in terrain (i.e. flying over a cliff).

The verification processing is further illustrated through an example. In one embodiment, a phase code is used to resolve radar range ambiguities and particularly a 13 bit phase code provides 20×log(13) or 22 dB of rejection to range sidelobes. However, if verification processor 244 should, for some reason, line itself on an ambiguous side lobe, even if the mainlobe is for example 22 dB higher in amplitude, verification processor 244 will stay aligned with the sidelobe as long as there is a greater than 22 dB sensitivity margin. As stated above, one such example is flying over a sharp and deep cliff where a maximum radar track rate is less than a rate at which the range changes over the cliff. However, in practice, and assuming an ambiguous range sidelobe is lined up, a transition to a decreased sensitivity margin will normally result in a less than sufficient margin to track the ambiguous range side lobe. Examples include flying over poor reflectivity ground or encountering a severe aircraft roll. The result is verification processor 244 realigning into a proper and unambiguous line up onto the main lobe. Thus an ambiguous radar range does, after some time, normally correct itself. However, and especially with auto pilot systems, severe and dangerous aircraft altitude corrections will result during the time of this very undesirable ambiguous range condition.

The method illustrated in flowchart 670 resolves the above illustrated situation by continuously searching for the main lobe, while tracking what is believed to be the correct position, or lobe. If during the ambiguity processing, or verification background search, it is determined that an ambiguous range is being tracked, an immediate correction is made to get the radar onto the correct range (i.e. the main lobe). To detect if the radar is on an ambiguous range track, the 20LogN equation is utilized to continuously determine differences between the main lobe, and undesired side lobes.

The above described methods and systems describe a digital signal processing solution to known radar target position and range ambiguity problems. Use of digital signal processing techniques therefore enables a radar system to perform faster and more accurate airborne processing than known radar ambiguity solutions. While the invention has been described in terms of various specific embodiments, those skilled in the art will recognize that the invention can be practiced with modification within the spirit and scope of the claims.

What is claimed is:

1. A method for calculating a center frequency and a bandwidth for a radar doppler filter, the center frequency and bandwidth calculated to provide radar performance over varying terrain and aircraft altitude, pitch, and roll by keeping a doppler swath centered in an antenna beam, said method comprising:

receiving an antenna mounting angle, a slant range, and velocity vectors in body coordinates;

calculating a range swath doppler velocity, and a track and phase swath bandwidth using the antenna mounting angle, slant range, and velocity vectors;

calculating a phase swath doppler velocity based at least in part on the range swath doppler velocity and the track and phase swath bandwidth;

calculating a range swath center frequency based on the range swath doppler velocity;

calculating a phase swath center frequency based on the phase swath doppler velocity; and calculating a level and verify swath bandwidth based upon the track and phase swath bandwidth.

2. A method according to claim 1 wherein calculating a range swath doppler velocity comprises determining a doppler velocity, Vr at a range swath center frequency according to $Vr=Vv \times Cos(90-r-a)=Vv \times Sin(a+r)$, where $Vv=(Vx^2+Vz^2)^{0.5}$, where Vx=velocity component on body x axis and Vz=velocity component on body z axis, $a=ATan(Vz/Vx)$, and r is the antenna mounting angle.

3. A method according to claim 2 wherein calculating a range swath center frequency comprises determining a range swath center frequency, Fr, according to $Fr=2 \times Vr/L$, where L is a wavelength of the radar.

4. A method according to claim 3 wherein the wavelength, L, is 0.2291 feet.

5. A method according to claim 1 wherein calculating a phase swath doppler velocity comprises calculating a phase swath doppler velocity, Vp, according to $Vp=Vv \times Cos(90-(r-p)-a)=Vv \times Sin(a+r-p)$, where $Vv=(Vx^2+Vz^2)^{0.5}$, where Vx=velocity component on body x axis and Vz=velocity component on body z axis, $a=ATan(Vz/Vx)$, r is the antenna mounting angle, and $p=(T \times Vx/H) \times (180/\pi)$ in degrees, where $T=1/\pi B$ and is a delay through range swath filter, T×Vx is vehicle movement on body X axis, B is the swath bandwidth, and H is altitude in feet.

6. A method according to claim 5 wherein calculating a phase swath center frequency comprises determining a phase swath center frequency, Fp, according to $Fp=2 \times Vp/L$, where L is a wavelength of the radar.

7. A method according to claim 6 wherein the wavelength, L, is 0.2291 feet.

8. A method according to claim 1 wherein calculating a track and phase swath bandwidth, B, comprises:

setting a filter time constant equal to a time for travel across a swath; and calculating filter bandwidth, B, according to $B=Vx/(0.6(H)^{0.5})$ in hertz, where Vx=velocity component on body x axis and H is altitude in feet.

9. A method according to claim 8 wherein level and verify swath bandwidth is calculated as a ratio of level and verify bandwidths to track and phase bandwidths, K, multiplied by track and phase swath bandwidth, B.

10. A processor configured to:

receive an antenna mounting angle, a slant range, and velocity vectors in body coordinates;

calculate a range swath doppler velocity, and a track and phase swath bandwidth using the antenna mounting angle, slant range, and velocity vectors;

calculate a phase swath doppler velocity based at least in part on the range swath doppler velocity and the track and phase swath bandwidth;

calculate a range swath center frequency based on the range swath doppler velocity;

calculate a phase swath center frequency based on the phase swath doppler velocity; and calculate a level and verify swath bandwidth based upon the track and phase swath bandwidth.

* * * * *